United States Patent [19]
Bota et al.

[11] Patent Number: 5,393,279
[45] Date of Patent: Feb. 28, 1995

[54] CONTROL SYSTEM FOR AUTOMATIC TRANSMISSION USING TORQUE CONVERTER SPEED RATIO TO DETERMINE THE ON-TIME FOR A SOLENOID CONTROLLED 3-2 TIMING VALVE

[75] Inventors: Keiji Bota; Hiroshi Yoshimura; Kenji Kurisu, all of Hiroshima, Japan

[73] Assignee: Mazda Motor Corporation, Hiroshima, Japan

[21] Appl. No.: 931,470

[22] Filed: Aug. 20, 1992

[30] Foreign Application Priority Data

Aug. 20, 1991 [JP] Japan .................. 3-208237
Oct. 30, 1991 [JP] Japan .................. 3-285193
Oct. 30, 1991 [JP] Japan .................. 3-285196

[51] Int. Cl.6 ............... F16H 61/06; F16H 61/08
[52] U.S. Cl. ..................... 477/143; 477/147
[58] Field of Search ........... 74/866, 889; 364/424.1; 477/143, 147, 149, 153

[56] References Cited

U.S. PATENT DOCUMENTS

| | | | |
|---|---|---|---|
| 4,671,139 | 6/1987 | Downs et al. ............. | 74/866 |
| 4,709,596 | 12/1987 | Boda et al. ............. | 477/147 X |
| 4,753,135 | 6/1988 | Sotoyama et al. ........ | 74/866 |
| 4,845,618 | 7/1989 | Narita ..................... | 74/866 X |
| 4,953,090 | 8/1990 | Narita ..................... | 74/866 X |
| 5,079,972 | 1/1992 | Iizuka .................... | 477/143 X |
| 5,111,717 | 5/1992 | Takeuchi et al. ........ | 74/866 |
| 5,168,449 | 12/1992 | Benford ................. | 74/866 X |

FOREIGN PATENT DOCUMENTS 63-312558 12/1988 Japan .

Primary Examiner—Dirk Wright
Assistant Examiner—Khoi Q. Ta
Attorney, Agent, or Firm—Keck, Mahin & Cate

[57] ABSTRACT

An automatic transmission shift control system includes a hydraulically controlled valve mechanism for connecting and disconnecting a supply of hydraulic pressure to frictional coupling elements. Connection and disconnection of the hydraulic pressure supply locks and unlocks the frictional coupling elements in order to automatically shift an automatic transmission into desired gears. A time regulator regulates a duration time for which the valve mechanism is kept actuated and with which a speed at which the frictional coupling element is locked changes. The time regulator is controlled so as to variably regulate the duration time according to conversion efficiency of a torque converter. This conversion efficiency is, for example, determined from a speed conversion ratio and a torque conversion ratio.

6 Claims, 19 Drawing Sheets

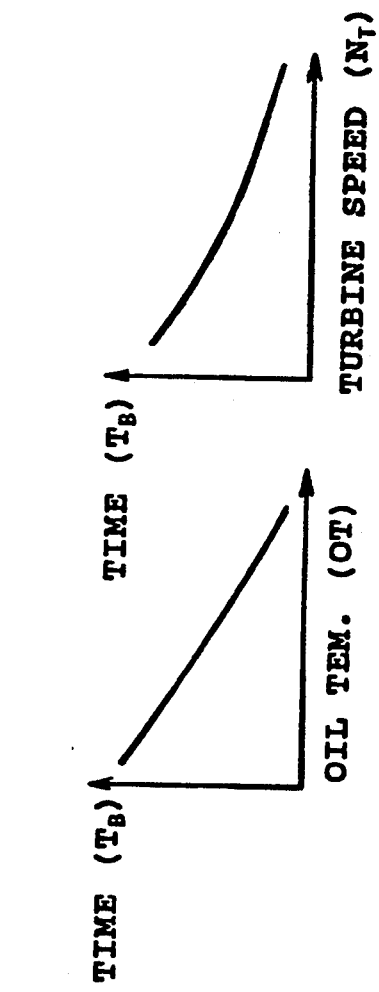
FIG. 6B
FIG. 6A
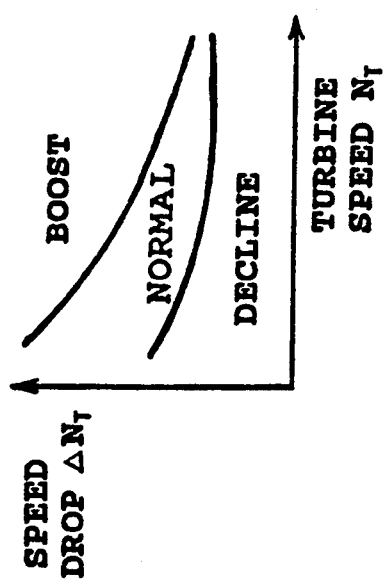
FIG. 5

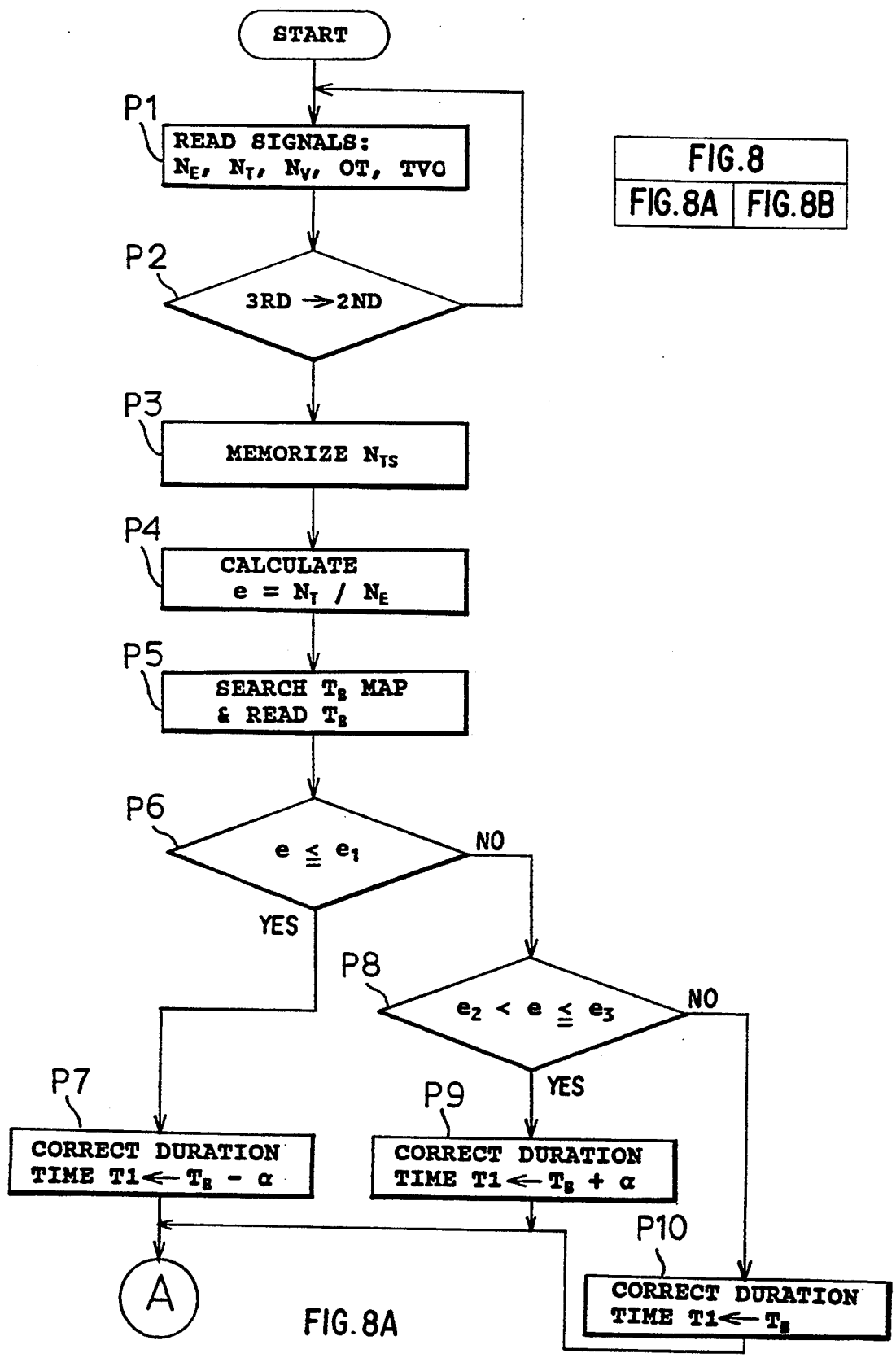

CONTROL SYSTEM FOR AUTOMATIC TRANSMISSION USING TORQUE CONVERTER SPEED RATIO TO DETERMINE THE ON-TIME FOR A SOLENOID CONTROLLED 3-2 TIMING VALVE

BACKGROUND OF THE INVENTION

1. Field of the Invention

This invention relates to a shift control system for an automatic transmission with a torque converter.

Automatic transmissions for automotive vehicles, which generally have torque converters and transmission gear mechanisms, typically include pluralities of frictional coupling elements, such as clutches and brakes. In such an automatic transmission, the frictional coupling elements are selectively locked and unlocked so as to change a torque transmission path of the transmission gear mechanism, thereby shifting the automatic transmission to any desired gear. In order to selectively lock and unlock the frictional coupling elements, the automatic transmission is provided with a hydraulic control system.

2. Description of Related Art

A transmission gear mechanism of an automatic transmission of this kind conventionally includes a gear mechanism, such as a planetary gearset having a plurality of gears and a carrier. A hydraulic control system, which manages selective locking and unlocking of the frictional coupling elements of the transmission gear mechanism, includes pressure regulating valves for adjusting pressure provided by an oil pump to a predetermined line pressure level, a manually operated valve for shifting the automatic transmission into various ranges, and a plurality of shift valves automatically operated according to engine operating conditions for selectively opening and closing hydraulic oil paths so as to selectively lock and unlock the frictional coupling elements. The hydraulic control system further includes solenoid valves controlled by a control unit so as to actuate the shift valves.

In this kind of automatic transmission, if necessary frictional coupling elements are locked too early or unlocked too late during a shift, an engine equipped with the automatic transmission is subjected to what is known as a "speed decline" which results in a drop in output torque. However, if the necessary frictional coupling elements are locked too late or unlocked too early, the engine is subjected to what is known as a "speed boost," which results in an abrupt increase in output torque. In order to eliminate such a drop or rapid increase in output torque, the frictional coupling elements must be locked and unlocked at well controlled timings.

For locking and unlocking the frictional coupling elements of the automatic transmission at appropriate timings, the hydraulic control system is provided with orifices and bypass passages for bypassing the orifices. The orifices and bypass passages are provided in hydraulic passages for supplying hydraulic pressure to servo mechanisms. The bypass passages are opened and closed by timing valves actuated and deactuated by solenoid valves. Specifically, such a timing valve is actuated so as to open the bypass passage for a desired period of time at the beginning of a shift operation of the automatic transmission, thereby regulating a timing at which necessary frictional coupling elements are locked and unlocked. Subsequently, the bypass passage is closed so that the hydraulic pressure is supplied through the orifice for a gentle shift operation.

During, for instance, a 3—2 (third gear to second gear) down-shift of the automatic transmission, it is typical to release hydraulic pressure supplied to the servo mechanism so as to lock a 2—4 brake simultaneously with unlocking of a 3—4 clutch. In order to reduce shift shock caused in the automatic transmission during a gear shift, it is necessary to change a locking timing for the 2—4 brake in correspondance with vehicle speeds. For this reason, some of the conventional automatic transmission shift control systems are provided with a solenoid valve controlled 3—2 timing valve for controlling a 3—2 shift down timing. The 3—2 timing valve is kept actuated or turned on for a time period set according to vehicle speeds. Such a time period is controlled by learning changes in speed of a turbine of the torque converter caused as a result of the 3—2 down-shift. Such an automatic transmission shift control system is known from, for instance, Japanese Unexamined Patent Publication No. 63-312,558.

The 3—2 timing valve of the automatic transmission shift control system described in the publication mentioned above is controlled in accordance with vehicle speeds, and the time period for which the 3—2 valve is kept opened or turned on is "learning-controlled" simply based on changes in speed of the turbine. In this automatic transmission shift control system, however, there is still a problem in that shift shock is not steady, due to varying rapidness and depression stroke of an accelerator pedal, even though the vehicle speed may be steady. If depression of the accelerator pedal, which is ordinarily made for a down-shift, is performed slowly, the output torque of the engine, and hence line pressure, increases following the slow depression of the accelerator pedal, so as to lock a 2—4 brake quickly as a result of actuating or turning on the 3—2 timing valve. Also, since the output torque of the engine can not increase sufficiently following quick depression of the accelerator pedal, the line pressure develops with a time lag after a down-shift demand occurs, so as to slow the locking of the 2—4 brake. Such a quick or slow depression of the accelerator pedal for a 3—2 down-shift causes the 2—4 brake to be locked at an improper timing, and shift shock is not reduced sufficiently during the down-shift.

In a conventional control system, in which the 3—2 timing valve is controlled according to vehicle speeds and the duration time learning control is performed for the 3—2 timing valve based on a change in turbine speed, it is also difficult to always keep an optimum learning control. Consequently, shift shock during a gear shift is not sufficiently prevented. This is because even if the vehicle travels at a constant speed, a boost in turbine speed differs according to the quickness of depression of an accelerator pedal and the stroke of depression of the accelerator pedal or the opening of a throttle valve. For the same reason, if the accelerator pedal is depressed faster or slower than is ordinary, a boost or decline in turbine speed is undesirably enhanced. Consequently, even for the same turbine speed, a boost in turbine speed may occasionally fall into or out of a standard range of speed changes established for the proper duration time learning control according to depression strokes of the accelerator pedal. This leads to an unstable judgement of a proper speed change. For example, an accelerator pedal may be operated so as to tend to boost the turbine speed after an acceleration operation is repeated, which tends to cause the speed of the turbine to cause the speed of the turbine to decline and, consequently, to make the learned duration time longer and longer. As a result, the turbine is undesirably boosted to an excessively high speed. Otherwise, if the accelerator pedal is operated so as to tend to reduce the turbine speed after an acceleration operation is repeated, which tends to cause the speed of the turbine to be easily boosted and, consequently, to make the learned duration time shorter and shorter, the turbine speed is undesirably reduced to an excessively low speed. In any case, heavy shift shocks occur.

SUMMARY OF THE INVENTION

It is an object of the present invention to provide a shift control system for an automatic transmission in which the quickness of locking frictional coupling elements is optimized, regardless of the quickness of depression of an acceleration pedal, so that the locking of frictional coupling element is caused at a proper timing and, accordingly, shift shocks are desirably prevented.

It is another object of the present invention to provide a shift control system for an automatic transmission in which an optimum duration time learning control is performed so as to lock frictional coupling elements at a proper timing.

The foregoing objects are accomplished by providing a control system for controlling an automatic transmission equipped with a transmission gear mechanism which has a plurality of frictional coupling elements for changing a torque transmission path. The control system includes frictional coupling element operating means for operating the frictional coupling elements, mechanism control means for controlling the frictional coupling element operating means so as to lock the frictional coupling elements at a predetermined locking speed, torque condition detecting means for detecting a transmission gear mechanism input torque condition at the time of gear shifting, and control altering means for altering the predetermined locking speed based on a detected signal from the torque condition detecting means.

According to another aspect of the invention, a learned value for controlling a time at which a solenoid or timing valve is turned on is renewed, in accordance with input torque conditions, in order to prevent improper learning. The learned value is set based on a standard for judgement determined from a map. The standard for setting the learned value is changed linearly or stepwise according to a torque convertor speed ratio as an input torque condition. In accordance with one embodiment of the invention, a learned value is selected, from among a plurality of preset values, in accordance with the torque convertor speed ratio. In another embodiment of the invention, learning control is conducted only under a predetermined condition.

BRIEF DESCRIPTION OF THE DRAWINGS

The above and other objects and features of the present invention will be apparent to those skilled in the art from the following description of preferred embodiments thereof when considered in conjunction with the accompanying drawings, in which:

FIG. 5 is a map of speed drop limits used in a duration time learning control;

FIG. 6 is a map of nominal duration time used in a duration time learning control;

DETAILED DESCRIPTION OF THE PREFERRED EMBODIMENTS

Figure 1:
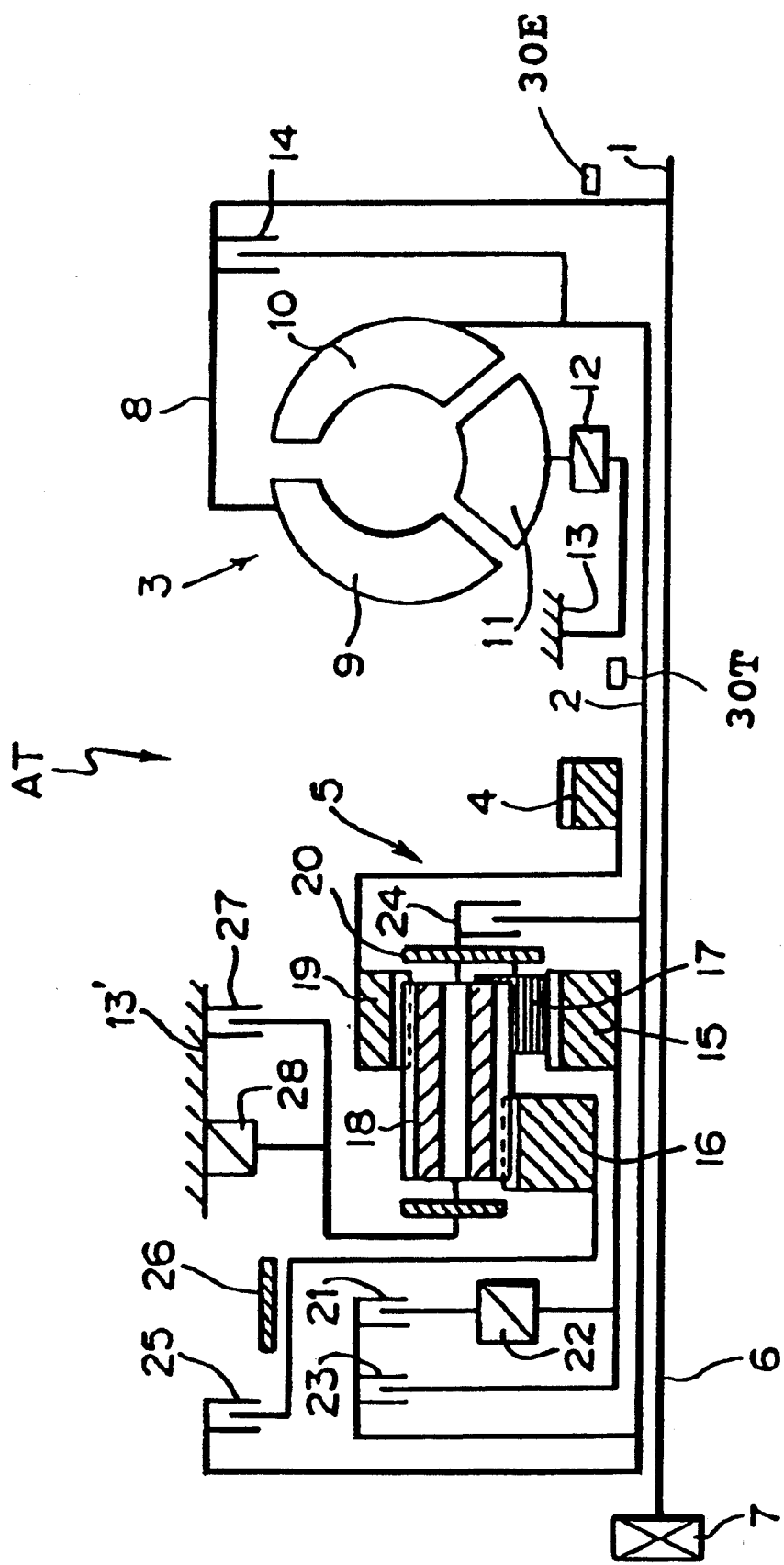
FIG. 1 is a skeleton diagram illustrating an automatic transmission.
Figure 2:
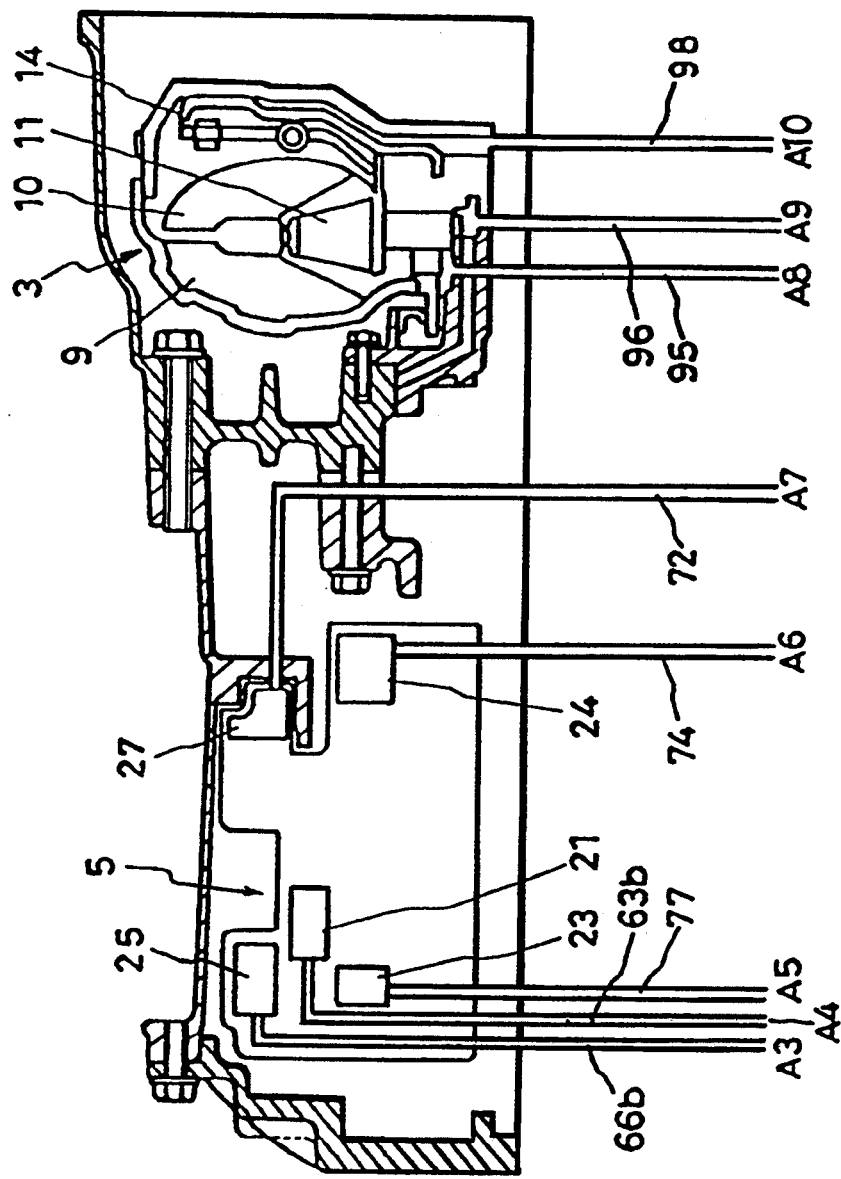
FIG. 2 is a schematic cross-sectional view of hydraulically controlled frictional coupling elements of the automatic transmission of FIG. 1.
Figure 2:
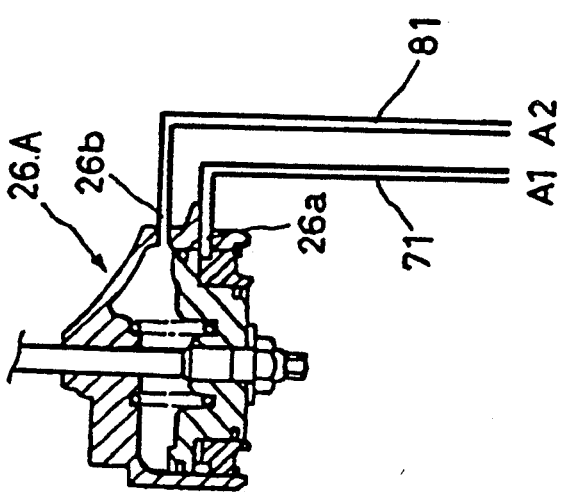
Figure 3A:
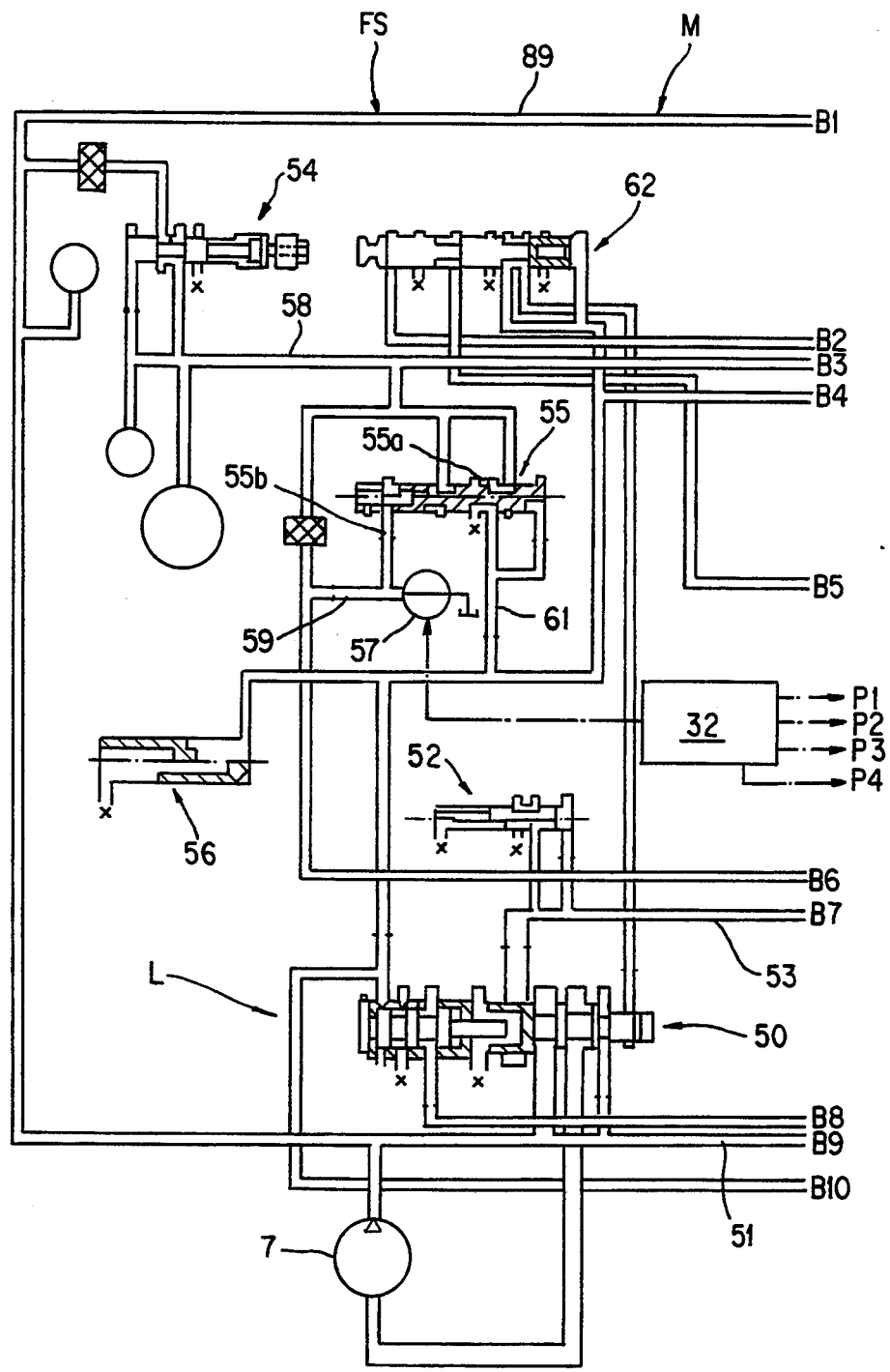
FIG. 3 is a diagram showing a hydraulic control circuit for controlling the automatic transmission of FIG. 1.
Figure 3B:
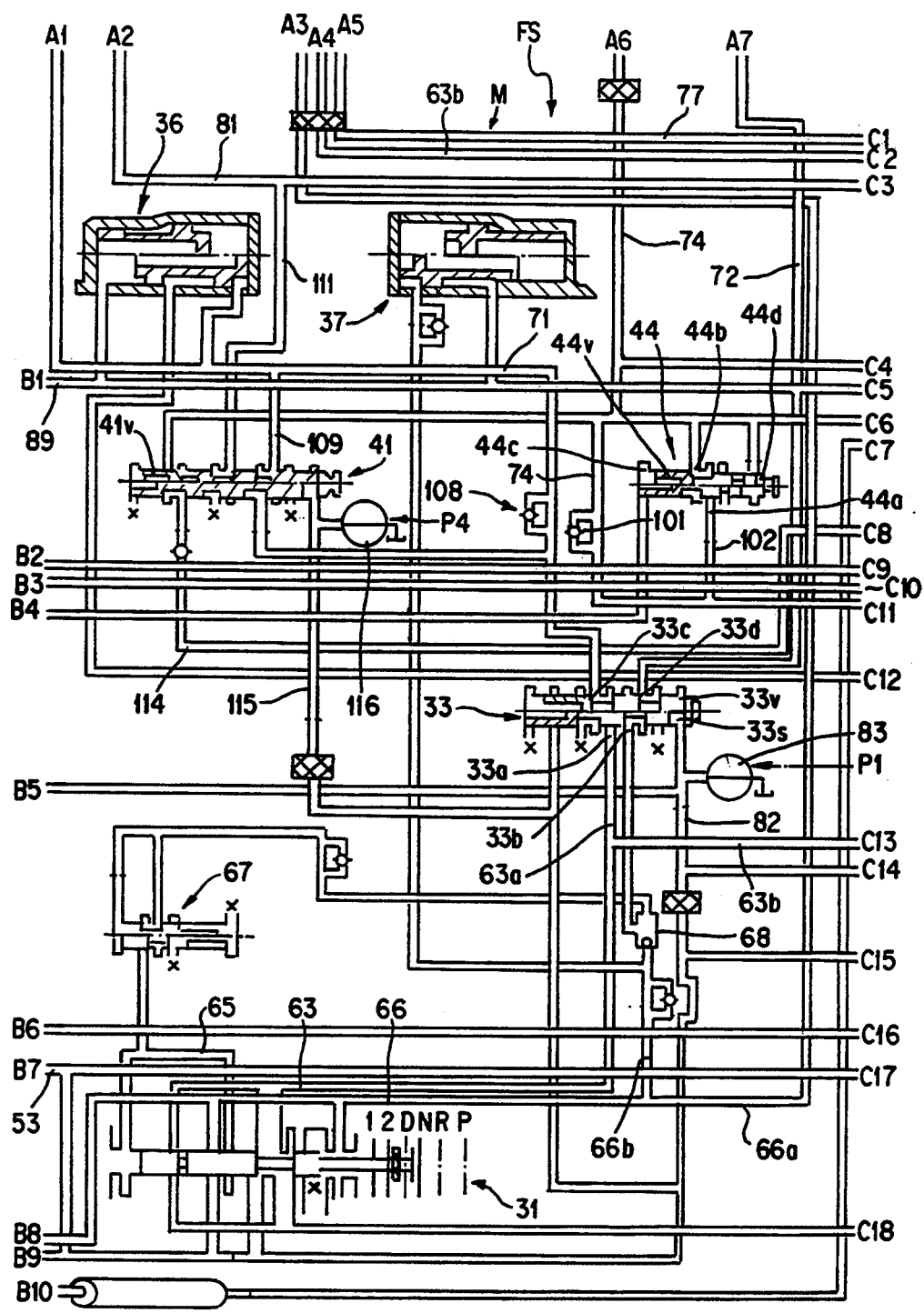
Figure 3C:
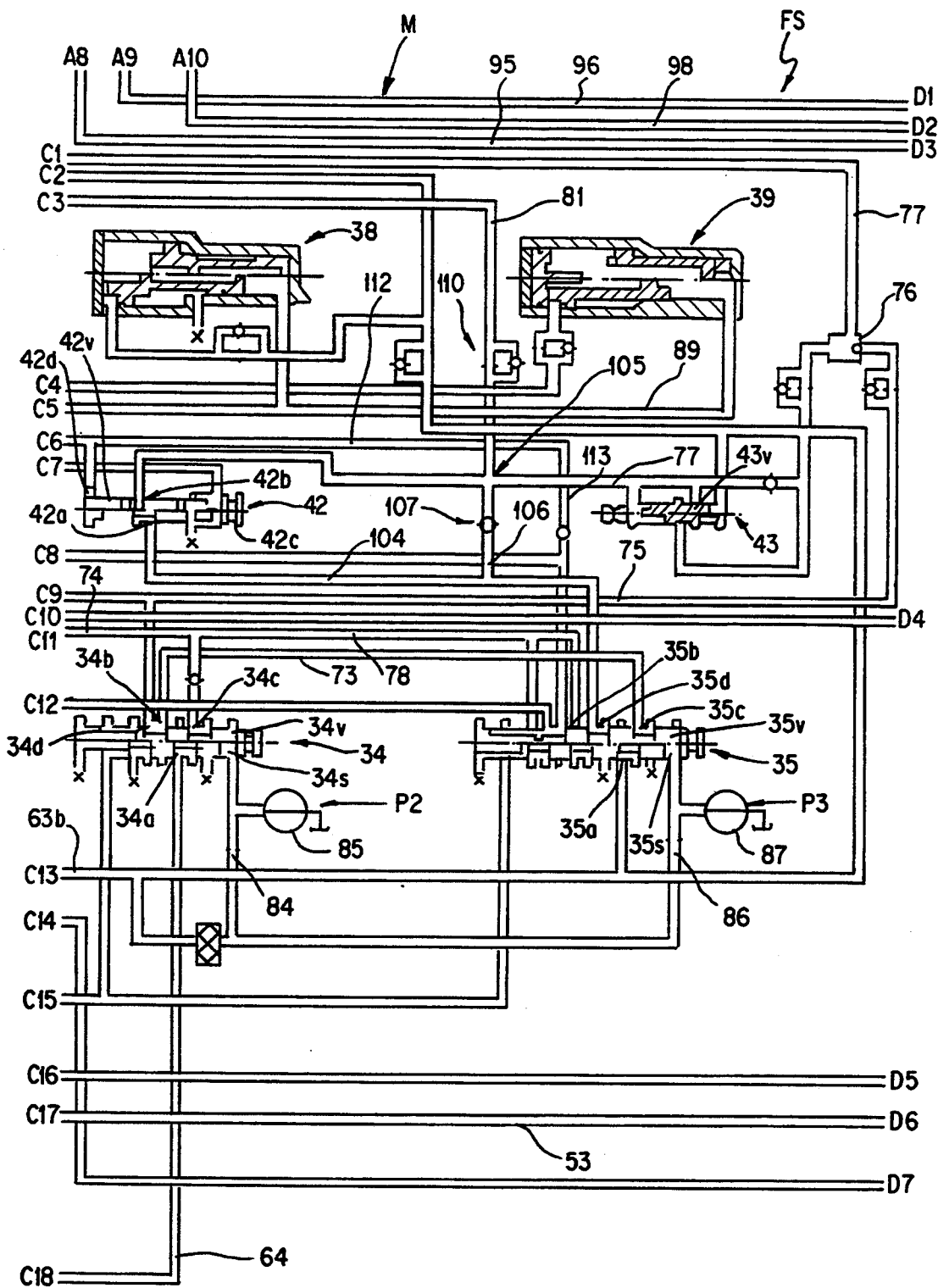
Figure 3D:
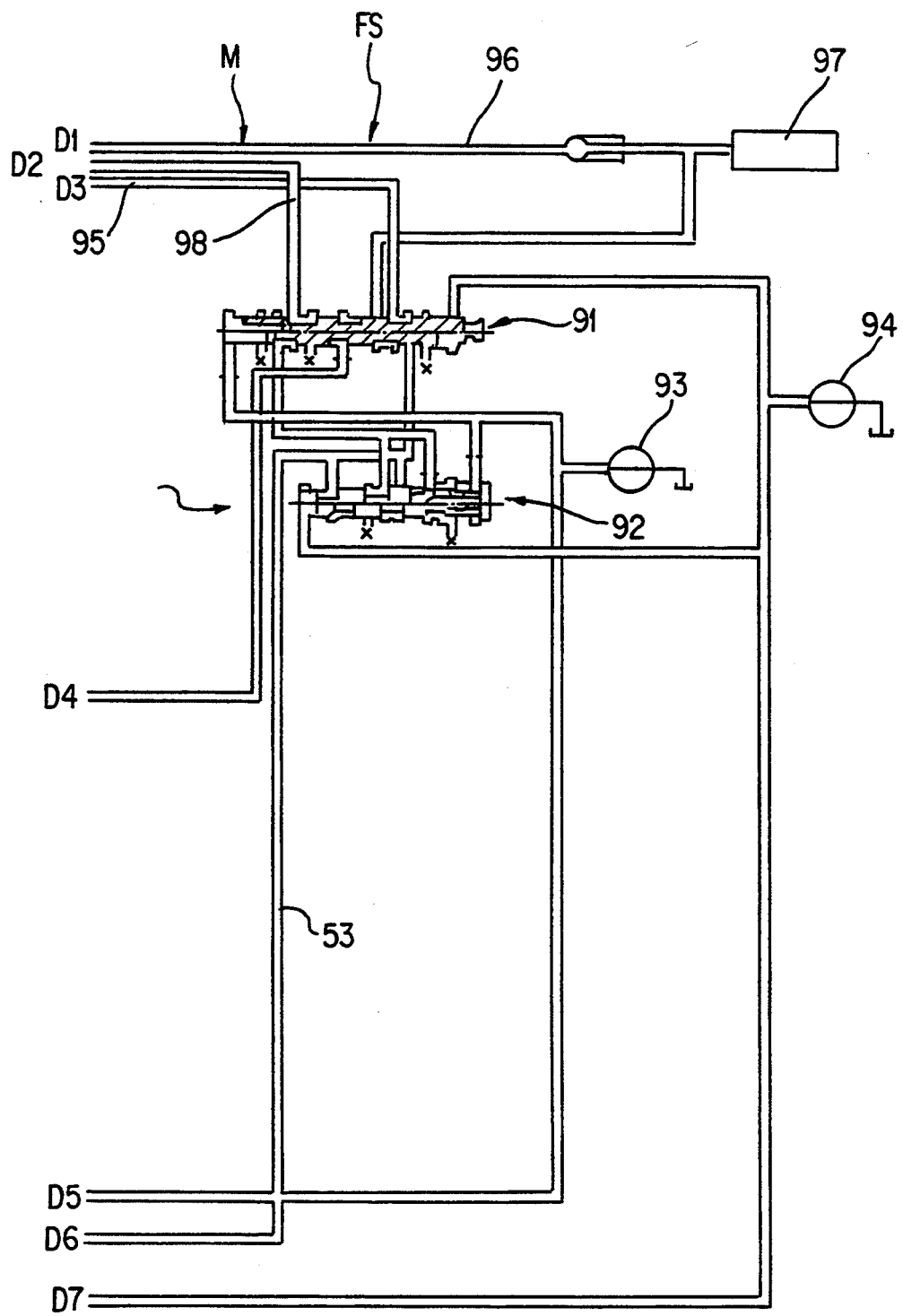

Referring to the drawings in detail and, in particular, to FIG. 1, an automatic transmission for an automotive vehicle is shown. The automatic transmission is controlled by a shift control system according to a preferred embodiment of the invention. The automatic transmission AT has a transmission gear mechanism 5 and is equipped with a torque converter 3. The torque converter 3, which may be of any known type, has an impeller 9 fastened to an engine output shaft 1, such as a crankshaft, through a connection member 8, a turbine 10 fastened to a turbine shaft 2, and a stator 11 disposed between the impeller 9 and the turbine 10 and secured to a transmission casing 13 through a one-way clutch 12. The turbine 10 is driven by working oil discharged by the impeller 9. The stator 11 intercepts the working oil thrown off by the turbine 10 and redirects the path of the working oil so it will enter the impeller 9 smoothly. The torque converter 3, if necessary, may be equipped with a lock-up clutch 14 for mechanically coupling the engine output shaft 1 and the turbine shaft 2 together. The turbine shaft 2, which is made of a hollow tube, is coaxially mounted on an oil pump shaft 6 which is connected to the engine output shaft 1 at one end and to an oil pump 7 at the other end. The torque converter 3, thus structured, transmits all available engine torque and multiplies the engine torque at a ratio corresponding to the difference between speeds of the impeller 9 and the turbine 10. The engine torque is transmitted, by the transmission gear mechanism 5, to driving wheels through an output gear 4.

The transmission gear mechanism 5 is of a type having a planetary gearset well known in the art. The transmission gear mechanism includes various gears, such as sun gears 15 and 16, a plurality of pinion gears 17 and 18, and a ring gear 19. The sun gear 15, which has a small diameter and, accordingly, is referred to as a small sun gear, is mounted for rotation on the turbine shaft 2. The sun gear 16, which has a large diameter and, accordingly, is referred to as a large sun gear, is mounted behind the small sun gear 15 for rotation on the turbine shaft 2. A plurality of pinion gears 17 (only one of which is illustrated and each of which is referred to as a short pinion gear) are disposed around the small sun gear 15 so as to mesh with the small sun gear 15. The pinion gear 18 is greater in axial length than the short pinion gears 17 and, accordingly, is referred to as a long pinion gear. The long pinion gear 18 meshes with the short pinion gears 17 at its front portion and with the large sun gear 16 at its rear portion. The ring gear 19 meshes with the long pinion gear 18 and is connected to the output gear 4. The short pinion gears 17 and the long pinion gear 18 are carried by a carrier 40 for rotation. The transmission gear mechanism 5, on one hand, selectively assigns one of the small sun gear 15, the large sun gear 16 and the carrier 20 to a torque input element in accordance with transmission gears and, on the other hand, definitely assigns the ring gear 19 to a torque output element for all possible gears of the automatic transmission.

Transmission gear mechanism 5 is provided with a plurality of frictional coupling elements, such as clutches and brakes, in order to switch its torque transmission path so as to establish different torque ratios and reverse the direction of rotation of the output gear 4. Specifically, a forward clutch 21 and a first one-way clutch 22 are provided, in series, between the turbine shaft 2 and the small sun gear 15. A coast clutch 23 is provided between the turbine shaft 2 and the small sun gear 15 in parallel with the clutches 21 and 22 with respect to the small sun gear 15. A 3—4 clutch 24 is provided between the turbine shaft 2 and the carrier 20, and a reverse clutch 25 is provided between the turbine shaft 2 and the large sun gear 16. A 2—4 brake 26 is provided between the large sun gear 16 and the reverse clutch 25 so as to lock or fix the large sun gear 16 in specific gears. The 2—4 brake 26 has a brake band operated by a servo-piston 26A which will be described later. Between the carrier 20 and the transmission casing 13', there are provided a low-reverse brake 27 for locking or fixing the carrier 20 in a specific range and in a specific gear, and a second one-way clutch 28 for receiving reaction force from the carrier 20. The brake 27 and clutch 28 are arranged in parallel with each other. The automatic transmission AT is provided with a turbine speed sensor 30T and an engine speed sensor 30E, which detect the rotational speed of the turbine shaft 2 and the rotational speed of the output shaft 1 as the speed of the engine E.

Clutches 21, 23, 24 and 25 and brakes 26 and 27 are selectively locked and unlocked so as to shift the automatic transmission AT to desired ranges and gears as is shown in Table I. In Table I, each frictional coupling element is indicated as being locked or fixed by a symbol "ON." Otherwise, the frictional coupling element is unlocked or released.

TABLE I

| Range | | Clutch | | Brake | | | One-Way Clutch | |
|---|---|---|---|---|---|---|---|---|
| | | Forward | Coast | 3-4 Rev. | 2-4 | n-Rev. | 1ST | 2ND |
| Park | | | | | | | | |
| Reverse | | | | | | ON | ON | |
| Neutral | | | | | | | | |
| Drive | 1st Gear | ON | | | | | | ON |
| | 2nd Gear | ON | | | ON | | ON | |
| | 3rd Gear | ON | ON | ON | | | ON | |
| | 4th Gear | ON | | | ON | ON | | |
| 2nd | 1st Gear | ON | | | | | ON | ON |
| | 2nd Gear | ON | ON | | ON | | ON | |
| | 3rd Gear | ON | ON | ON | | | ON | |
| 1st | 1st Gear | ON | ON | | | ON | ON | ON |
| | 2nd Gear | ON | ON | | ON | | ON | |

(1) In the Park (P) range, all frictional coupling elements are kept unlocked or released. No torque is transmitted from the turbine shaft 2 to the transmission gear mechanism 5 at all.

(2) In the Reverse (R) range, the reverse clutch 25 and the low-reverse brake 27 are locked, and all other frictional coupling elements are kept unlocked or released. Since the low-reverse brake 27 is locked, the second one-way clutch 28, disposed in parallel with the low-reverse brake 27, effects nothing in particular. The first one-way clutch 22 is brought out of a torque transmission path so as to also effect nothing in particular.

In the reverse range, torque from the turbine shaft 2 is transmitted to the large sun gear 16 through the reverse clutch 25. Because the low-reverse brake 27 locks the carrier 20, the large sun gear 16, the long pinion gear 18 and the ring gear 19 engage with one another in order to form a gear train. This reduces the torque transmitted to the large sun gear 16 at a large reduction ratio, defined by a gear ratio between the large sun gear 16 and the ring gear 19, and outputs it through the output gear 4. In the reverse range, the ring gear 19, and hence the output gear 4, turns in a direction opposite to the direction in which the large sun gear 16 and the turbine shaft 2 turn, and the drive wheels are driven in a reverse direction.

(3) In the Neutral (N) range, all coupling elements are unlocked and in the same condition as in the P (Park) range.

(4) In the Drive (D) range, first gear condition, only the forward clutch 21 is locked, and all other coupling elements are kept unlocked. Although the first and second one-way clutches 22 and 28 are locked, they idle during coasting.

Torque from the turbine shaft 2 is transmitted to the small sun gear 15 through the forward clutch 21 and the first one-way clutch 22. Because the second one-way clutch 28 fixes the carrier 20, the small sun gear 15, the short pinion gear 17, the long pinion gear 18 and the ring gear 19 engage with one another in order to form a gear train. This reduces the torque transmitted to the large sun gear 16 at a large reduction ratio, defined by a gear ratio between the small sun gear 15 and the ring gear 19, and outputs it through the output gear 4. The ring gear 19, and hence the output gear 4, turns in the same direction as the small sun gear 15 and the turbine shaft 2, and the drive wheels are driven in a forward direction. In the drive range, first gear condition, engine braking is not effective, due to the operation of the first one-way clutch 22.

(5) In the Drive (D) range, second gear condition, the forward clutch 21 and the 2—4 brake 26 are locked, and all other coupling elements are kept unlocked. Although the first one-way clutch 22 is locked, it idles during coasting. The second one-way clutch 28 always idles.

Because the large sun gear 16 is fixed, the long pinion gear 18 turns or revolves around the large sun gear 16. Accordingly, although torque is basically transmitted through the same path as in the drive range, first gear condition, the reduction ratio at which the torque is transmitted to the output gear 4 is slightly smaller than that at which the torque is transmitted in the drive range, first gear condition, because the rotational speed of the ring gear 19 is made higher by revolutions of the long pinion gear 18. In the drive range, second gear condition, engine braking is not effective, due to the operation of the first one-way clutch 22.

(6) In the Drive (D) range, third gear condition, the forward clutch 21, the coast clutch 23 and the 3—4 clutch 24 are locked, and all other coupling elements are kept unlocked. The forward clutch 21 and the first one-way clutch 22, which are disposed in parallel with the coast clutch 23 with respect to the turbine shaft 2, effect nothing in particular, because the coast clutch 23 is kept unlocked. The second one-way clutch 28 always idles.

Because the small sun gear 15 and the carrier 20 are locked together by the coast clutch 23, the turbine shaft 2 and the 3—4 clutch 24, all of the gears 15 to 19 and the carrier 20 are locked together and rotate as one unit. This is an inherent feature of the planetary gearset. Since these coupling elements rotate together as one unit, the turbine shaft 2 and the output shaft 4 are directly coupled together. Accordingly, torque from the turbine shaft 2 is transmitted to the output shaft 4 without any reduction, i.e., at a torque reduction ratio of 1:1. The output gear 4 turns in the same direction as the direction in which the turbine shaft 2 turns, so as to drive the drive wheels in the forward direction. In the drive range, third gear condition, in which the turbine shaft 2 and the output shaft 4 are directly coupled together, engine braking is, of course, effective.

(7) In the Drive (D) range, fourth gear condition, the forward clutch 21, the 3—4 clutch 24 and the 2—4 brake 26 are locked, and all other coupling elements are kept unlocked. The first and second one-way clutches 22 and 28 idle at all times. Although the forward clutch 21 is locked, the forward clutch 21 effects nothing in particular, because the first one-way clutch 22 idles at all times.

Torque from the turbine shaft 2 is transmitted to the carrier 20 through the 3—4 clutch 24, and then to the output gear 4 through the long pinion gear 18 and the ring gear 19, in order. Because the 2—4 brake 26 fixes the large sun gear 16, the long pinion gear 18 turns by revolving around the large sun gear 16. Accordingly, since the ring gear 19 turns at a speed which, due to rotations of the long pinion gear 18, is higher than that of the carrier 20, and hence the turbine shaft 2, the transmission gear mechanism 5 is brought into an overdrive condition, in which rotational speed is multiplied. The ring gear 19 and the output gear 4 turn in the same direction as the carrier 20 and the turbine shaft 2, so as to drive the drive wheels in the forward direction.

(8) In the second (2nd) range, first gear condition, all of the coupling elements are placed in the same condition as in the D (Drive) range, first gear condition.

(9) In the second (2nd) range, second gear condition, the forward clutch 21, the coast clutch 23 and the 2—4 brake 26 are locked and all other coupling elements are kept unlocked. Because the coast clutch 23 is locked, the forward clutch 21 and the first one-way clutch 22, which are disposed in parallel with the coast clutch 22 with respect to the turbine shaft 2, effect nothing in particular. In the second (2nd) range, second gear condition, torque transmission and speed change are caused basically in the same manner as in the D (Drive) range, second gear condition, and engine braking is effective because the first one-way clutch 22 does nothing.

(10) In the second (2nd) range, third gear condition, all of the coupling elements are placed in the same condition as in the D (Drive) range, third gear condition.

(11) In the first (1st) range, first gear condition, the forward clutch 21, the coast clutch 23 and the low reverse brake 27 are locked, and all other coupling elements are kept unlocked. Because the coast clutch 23 is locked, the forward clutch 21 and the first one-way clutch 22, which are disposed in parallel with the coast clutch 23 with respect to the turbine shaft 2, provide no particular effects. Also, since the low-reverse brake 27 is locked, the second one-way clutch 28, disposed in parallel with the low-reverse brake 27 with respect to the long pinion gear 18, effects nothing in particular. Torque transmission and speed change are caused basically in the same manner as in the D (Drive) range, first gear condition, and engine braking is effective because the first and second one-way clutches 22 and 28 do nothing.

(12) In the first (1st) range, second gear condition, all of the coupling elements are in the same conditions as in the second (2nd) range, second gear condition.

The operation of the frictional coupling elements is controlled and the coupling elements are selectively locked and unlocked by a hydraulic control system shown in FIG. 3. The hydraulic control system FS includes a line pressure control mechanism L for controlling a line or fundamental pressure, a hydraulic passage network M formed by a number of passages for supplying a hydraulic pressure to respective parts and releasing it from the parts, and a lock-up control mechanism U for controlling the hydraulic pressure supplied to the torque converter 3 and the lock-up clutch 14. The hydraulic control system FS includes various valves, such as a manual valve 31, shift valves 33, 34 and 35, timing valves 41, 42 and 43, and a bypass valve 44. The manual valve 31 is shifted in response to a shift or selector lever (not shown) so as to change from one set of line pressure passages to another. The shift valves, such as a 1—2 shift valve 33, a 2—3 shift valve 34 and a 3—4 shift valve 35, are electrically operated by a control unit 32, mainly formed by a microcomputer, to shift according to shifted positions of the manual valve 31 and drive conditions of the vehicle such as a vehicle speed and a throttle opening. The timing valves, such as a 3—2 timing valve 41, a 2—3 timing valve 42 and a coast timing valve 43, cooperate with the bypass valve 44 so as to adjust a timing at which a hydraulic pressure is supplied to and released from the specific frictional coupling elements. The hydraulic control system FS further includes accumulators, such as a 1—2 accumulator 36, a N—R accumulator 37, a N—D accumulator 38 and a 2—3 accumulator 39, for cushioning the supply of hydraulic pressure to specific frictional coupling elements and the release of hydraulic pressure from specific frictional coupling elements. The hydraulic passage network M is formed with a plurality of orifices and is provided with one-way valves so as to control fluid resistance of its specific parts. In the drawings, the orifices and the one-way valves are illustrated by generally used symbols or marks and are not specifically designated by reference numbers.

Hydraulic control system FS variably controls hydraulic pressure acting on the frictional coupling elements according to the ranges, i.e., park, reverse, neutral, drive, 2nd and 1st ranges, and drive conditions of the vehicle, so as to shift gears of the transmission gear mechanism 5. The line pressure control mechanism L generates a hydraulic or line pressure in a line pressure passage 51, which is regulated by a regulating valve 50 so as to be substantially proportional to a pilot pressure for the regulating valve 50. The line pressure, thus regulated, is supplied to the manual valve 31 and the other valves. The line pressure in the line pressure passage 51 is, after being regulated by the regulating valve 50, also supplied to the torque converter 3 through a hydraulic passage 53, in which a relief valve 52 is provided. The pilot pressure for the regulating valve 50 is developed by a pressure reducing valve 54, a modulator valve 55, a line pressure control accumulator 56, and a line pressure control solenoid valve 57 having a duty ratio which is controlled by the control unit 32.

In more detail, the line pressure in the line pressure passage 51, after being reduced by the pressure reducing valve 54, is introduced to an inlet port 55a of the modulator valve 55 through a reduced pressure passage 58. The line pressure is also introduced to the modulator valve 55 at its control port 55b through the reduced pressure passage 58 and a duty pressure passage 59. The hydraulic pressure introduced to the modulator valve 55 at the control port 55b is controlled by the line pressure control solenoid valve 57, which is controlled by the control unit 32 so as to open and close at an appropriate duty ratio. The duty ratio is variably set at the control unit 32 based on vehicle driving conditions, such as a throttle valve opening, a vehicle speed, a gear range of the automatic transmission, etc. A hydraulic pressure, corresponding to the hydraulic pressure introduced to the modulator valve 55 at the control port 55b, is transmitted into a pilot pressure passage 61 as pilot pressure for the regulating valve 50. Vibrations or pulsations of hydraulic pressure in the pilot pressure passage 61 are absorbed by the line pressure control accumulator 56. The regulating valve 50 generates a line pressure proportional to the pilot pressure thus developed and supplies it to the line pressure passage 51. The pilot pressure in the pilot pressure passage 61 is also supplied to a cut-back valve 62 which will be described later.

Manual valve 31 is shifted in cooperation with the shift lever (not shown) to communicate the line pressure passage 51 with working pressure passages so as to shift the automatic transmission AT to a range manually selected by the shift lever. In more detail, the line pressure passage 51 is brought by the manual valve 31 into communication with first and second main pressure supply passages 63 and 64 when the shift lever selects the drive (D) range and the second (2nd) range, first and third main pressure supply passages 63 and 65 when the shift lever selects the first (1st) range, and a reverse pressure passage 66 when the shift lever selects the reverse (R) range. The line pressure passage 51 is disconnected from communication with the pressure passages 63 to 66 when the shift lever selects the park (P) range and the neutral (N) range.

First main pressure passage 63 branches off into a pressure passage 63a for a 1—2 shift valve 33 and a pressure passage 63b for the forward clutch 21. The pressure passage 63a is in communication with the 1—2 shift valve 33 at its first inlet port 33a. The pressure passage 63b branches off into two passages so as to communicate with a 3—4 shift valve 35, at its first inlet port 35a, and the forward clutch 21, respectively. The second main pressure passage 64 is in communication with a 2—3 shift valve 34 at its first inlet port 34a. The third main pressure passage 65 is connected to a second branch pressure passage 66b of the reverse pressure passage 66, which will be described later, through a low pressure reducing valve 67 and a ball valve 68, and thereafter, communicated with the 1—2 shift valve 33 at its second inlet port 33b. The reverse pressure passage 66 branches off into a first branch passage 66a and the second branch passage 66b. The first branch passage 66a is in communication with the reverse clutch 25, and the second branch passage 66b is in communication with the 1—2 shift valve 33 through the ball valve 68.

Shift valves 33 to 35 are controlled by the control unit 32 so as to convert pressure at their inlet ports in accordance with selected ranges and gears and provide the converted pressure at their outlet ports. The converted pressure is supplied to their related frictional coupling elements. The shift valves 33 to 35 are also provided to release the pressure from the frictional coupling elements. That is, the 1—2 shift valve 33 is provided with the first and second inlet ports 33a and 33b and the first and second outlet ports 33c and 33d. The first outlet port 33c is in communication with the lock pressure port 26a of the 2—4 brake 26 through a pressure supply passage 71. The second outlet port 33d is in communication with the low reverse brake 27 through a pressure passage 72. The 2—3 shift valve 34 is provided with the first and second inlet ports 34a and 34b and first and second outlet ports 34c and 34d. The second inlet port 34b is in communication with a first outlet port 35c of the 3—4 shift valve 35 through a first connecting passage 73. The first outlet port 34c is in communication with the 3—4 clutch 24 through a pressure passage 74. The second outlet port 34d is in communication with the coast clutch 23 through a second connecting passage 75, a ball valve 76, and a pressure passage 77 for a coast clutch, which will be described later. A third connecting passage 78, branching off from the pressure passage 74 for the 3—4 clutch, is connected to the 3—4 shift valve 35 at its second inlet port 35b. The 3—4 shift valve 35 is provided with the first and second inlet ports 35a and 35b and the first and second outlet ports 35c and 35d. The second outlet port 35d is in communication with an unlock pressure port 26b of the 2—4 brake 26 through a pressure passage 81 and the coast clutch 23 through the pressure passage 77. The pressure passage 81 and the pressure passage 77 are joined together near the second outlet port 35d of the 3—4 shift valve 35.

Shift valves 33, 34 and 35 switch over their pressure transmission paths by shifting their valve spools 33v, 34v and 35v, respectively, between their extreme positions for locking and unlocking. As viewed in FIG. 3, a lock position and an unlock position are at the right end of movement of the spool and the left end of movement of the spool, respectively. In FIG. 3, the upper half of the valve spools are shown as being in the lock position, and the lower half of the spools are shown as being in the unlock position. Each spool 33v, 34v or 35v is forced to occupy its unlocked position when the pilot pressure is present in control pressure chambers 33s, 34s or 35s provided at the right end of the shift valves 33, 34 or 35, respectively, and returns to its lock position when the pilot pressure is released from the control pressure chambers 33s, 34s or 35s.

Control pressure chamber 33s of the 1—2 shift valve 33 is in communication with a first control pressure passage 82 branching off from the line pressure passage 51. The first control pressure passage 82 is provided with a first solenoid valve 83, which is controlled by the control unit 32 to turn on and off. When the first solenoid valve 83 is turned on, a pilot pressure of the control oil chamber 33s of the 1—2 shift valve 33 is released through the first control pressure passage 82, so that the valve spool 33v returns to the lock position. Simultaneously, the 1—2 shift valve 33 brings the first inlet port 33a and the first outlet port 33c into communication with each other and the second outlet port 33d and one of the drain ports (which are indicated by the symbol X) into communication with each other so as to release the pressure at the second outlet port 33d. On the other hand, when the first solenoid valve 83 is turned off, a pilot pressure is supplied into the control pressure chamber 33s of the 1—2 shift valve 33, forcing the spool 33v to occupy the unlock position, so as to release a pressure at the first outlet port 33c and bring the second inlet port 33b and the second outlet port 33d into communication with each other.

Control pressure chamber 34s of the 2—3 shift valve 34 is in communication with a second control pressure passage 84 branching off from the pressure passage 63b for the forward clutch 21. The second control pressure passage 84 is provided with a second solenoid valve 85, which is controlled by the control unit 32 to turn on and off. In the same manner as described above for the 1—2 shift valve 33, the spool 34v of the 2—3 shift valve 34 occupies the lock position and unlock position corresponding to turning on and off of the second solenoid valve 85. When the spool 34v occupies the lock position, the 2—3 shift valve 34 releases a pressure at the first outlet port 34c and brings the second inlet port 34b and the second outlet port 34d into communication with each other. On the other hand, when the spool 34v occupies the unlock position, the 2—3 shift valve 34 releases a pressure at the second outlet port 34d and brings the first inlet port 34a and the first outlet port 34c into communication with each other.

Similarly, the control oil chamber 35s of the 3—4 shift valve 35 is in communication with a third control pressure passage 86 branching off from the second control pressure passage 84. The third control pressure passage 86 is provided with a third solenoid valve 87, which is controlled by the control unit 32 to turn on and off. The spool 35v occupies either the lock position or the unlock position in response to the turning on and off of the third solenoid valve 87. When the spool 35v occupies the lock position, the 3—4 shift valve 35 releases a pressure at both the first and second outlet ports 35c and 35d. On the other hand, when the spool 35v occupies the unlock position, the 3—4 shift valve 35 brings the first inlet ports 35a and the first outlet ports 34c, and the second inlet ports 35d and the second outlet port 35d, into communication with each other, respectively.

In order to prevent the frictional coupling elements from causing shocks due to both an abrupt supply of hydraulic pressure to the frictional coupling elements and an abrupt release of hydraulic pressure from the frictional coupling elements, accumulators 36, 37, 38, and 39 are provided in the pressure supply passage 71, the second branch pressure passage 66b of the reverse pressure passage 66, the pressure passage 63b for the forward clutch 21, and the pressure passage 74 for the 3—4 clutch 24, respectively. Each accumulator 36 to 39 is supplied with a line pressure, as back pressure, through a back pressure passage 89 branching off from the line pressure passage 51. In addition, in order to prevent the transmission gear mechanism 5 from causing internal locking or double locking during range and gear shifts, the hydraulic control system FS is provided with various timing valves, such as a 3—2 timing valve 41, a 2—3 timing valve 42, a coast timing valve 43 and a bypass valve 44, all of which are used to adjust a locking and unlocking timing among the frictional coupling elements.

Lock-up control mechanism U, which may be of any well known type having a lock-up valve 91, a lock-up control valve 92, and first and second lock-up control solenoid valves 93 and 94, supplies pressurized working oil to the torque converter 3 through a pressure supply passage 95, returns the pressurized working oil in the torque converter 3 to an oil cooler 97 through a return passage 96, and supplies, if necessary, hydraulic pressure to the lock-up clutch 14 through a pressure passage 98.

The hydraulic pressure system FS controls the supply and release of hydraulic pressure for the frictional coupling elements according to the range positions of the manual valve 31 and the operated positions of the first to third solenoid valves 83, 85 and 87 so as to provide the ranges and the gears of the automatic transmission AT shown in TABLE I. TABLE II shows operating conditions of the first to third solenoid valve 83, 85 and 87 for the possible ranges and gears, such as park (P), reverse (R), neutral (N), drive (D), second (2nd) and first (1st) ranges and first (1st), second (2nd), third (3rd) and fourth (4th) gears.

It is to be noted that since hydraulic pressure is not supplied to any one of the first to third main pressure supply passages 63 to 65 and the reverse pressure passage 66 from the manual valve 31 in the park range and the neutral range, the hydraulic pressure is not supplied to any frictional coupling element in spite of the on and off states of the first to third solenoid valves 83, 85 and 87. Consequently, in these ranges, all the frictional coupling elements are kept unlocked, leaving the transmission gear mechanism 5 neutral, so as not to transmit any engine torque.

TABLE II

| Range | | First | | Second | | Third | |
|---|---|---|---|---|---|---|---|
| | | Solenoid | Valve | Solenoid | Valve | Solenoid | Valve |
| Park | | OFF | | ON | | ON | |
| Reverse | | | OFF | | OFF | | ON |
| Neutral | | | OFF | | ON | | ON |
| | | ON | | OFF | | OFF | |
| Drive | 1st Gear | OFF | | ON | | ON | |
| | 2nd Gear | ON | | ON | | ON | |
| | 3rd Gear | ON | | OFF | | OFF | |
| | 4th Gear | ON | | OFF | | ON | |
| 2nd | 1st Gear | OFF | | ON | | ON | |
| | 2nd Gear | ON | | ON | | OFF | |
| | 3rd Gear | ON | | OFF | | OFF | |
| 1st | 1st Gear | OFF | | ON | | OFF | |
| | 2nd Gear | ON | | ON | | OFF | |

Referring to TABLE II, paths of transmission of the hydraulic pressure in the hydraulic pressure mechanism FS in each range and shift gear will be explained.

(1) In the Reverse (R) range, the manual valve 31 occupies the reverse position. The first and second solenoid valves 83 and 85 are turned off, and the third solenoid valve 87 is turned on. Hydraulic pressure is supplied to the reverse clutch 25 through the reverse pressure passage 66 via the first branch passage 66a, so that the reverse clutch 25 is locked. The hydraulic pressure is also supplied to the low reverse brake 27 through the reverse pressure passage 66 via the 1—2 shift valve passage 66b, the second inlet and outlet ports 33b and 33d of the 1—2 shift valve 33, and the pressure passage 72, in this order, so that the low reverse brake 27 is locked. All other frictional coupling elements receive no hydraulic pressure and remain unlocked.

(2) In the Drive (D) range, first gear condition, the manual valve 31 occupies the drive position. Hydraulic pressure is supplied to the first and second main pressure supply passages 63 and 64. This operation is caused in second gear and in fourth gear in the drive range. The first solenoid valve 83 is turned on, and the second and third solenoid valves 85 and 87 are turned off. Hydraulic pressure is supplied to the forward clutch 21 through the first main pressure supply passage 63 and the pressure passage 63b, so that the forward clutch 21 is locked. All other frictional coupling elements are kept unlocked, because no hydraulic pressure is provided at the outlet ports of shift valves 33, 34 and 35.

(3) In the Drive (D) range, second gear condition, all of the first to third solenoid valves 83, 85 and 87 are turned on. The forward clutch 21 is locked. Hydraulic pressure is supplied to the 2—4 brake 26 at the lock pressure port 26a through the first main pressure supply passage 63, the pressure passage 63a and the pressure passage 71 via the first inlet and outlet ports 33a and 33c of the 1—2 shift valve 33. Since no unlock pressure is supplied to the unlock pressure port 26b, the 2—4 brake is locked. All other frictional coupling elements receive no hydraulic pressure and remain unlocked.

(4) In the Drive (D) range, third gear condition, the first solenoid valve 83 is turned on, and the second and third solenoid valves 85 and 87 are turned off. The forward clutch 21 is locked, and pressure is supplied to the 2—4 brake 26 at the lock pressure port 26a. However, since an unlock pressure is also supplied to the 2—4 brake 26 at the unlock pressure port 26b, the 2—4 brake 26 is unlocked. Hydraulic pressure is supplied to the 3—4 clutch 24 through the second main pressure supply passage 64 and the pressure passage 74 via the first inlet and outlet ports 34a and 34c of the 2—3 shift valve 34, so that the 3—4 clutch 24 is locked. Hydraulic pressure is supplied to the coast clutch 23 through the pressure passage 74, the third connecting passage 78 via the second inlet and outlet ports 35b and 35d of the 3—4 shift valve 35, and the pressure passage 77, so that the coast clutch 23 is locked. The unlock pressure developed at the second outlet port 35d is supplied to the 2—4 brake 26 at the unlock pressure port 26b through the pressure passage 81, so that the 2—4 brake 26 is unlocked. The reverse clutch 25 and the low reverse brake 27 receive no hydraulic pressure and remain unlocked.

(5) In the Drive (D) range, fourth gear condition, the first and third solenoid valves 83 and 87 are turned on, and the second solenoid valve 85 is turned off. The forward clutch 21, the 2—4 brake and the 3—4 clutch 24 are all locked. All other frictional coupling elements receive no hydraulic pressure and remain unlocked.

(6) In the Second (2nd) range, first gear condition, the manual valve 31 occupies the (2nd) range position. The pressure transmission path for the frictional coupling elements is formed in the same way as in the D (Drive) range, first gear condition.

(7) In the Second (2nd) range, first gear condition, the first and second solenoid valves 83 and 85 are turned on, and the third solenoid valve 87 is turned off. The forward clutch 21 and the 2—4 brake are locked. Hydraulic pressure is supplied to the coast clutch 23 through the pressure passage 63b, the 3—4 shift valve 35 via the first inlet and outlet ports 35a and 35c, the first connecting passage 73, the 2—3 shift valve 34 via the second inlet and outlet ports 34b and 34d, the second connection passage 75, the ball valve 76, and the pressure passage 77, in this order, so that the coast clutch 23 is locked. All other frictional coupling elements receive no hydraulic pressure and remain unlocked.

(8) In the Second (2nd) range, third gear condition, all of the frictional coupling elements are controlled in the same way as in the D (Drive) range, third gear condition.

(9) In the First (1st) range, first gear condition, the manual valve 31 occupies the first (1st) range position. Hydraulic pressure is supplied through the first and third main pressure supply passages 63 and 65. The first and third solenoid valves 83 and 87 are turned off, and the second solenoid valve 85 is turned on. The forward clutch 21 and the coast clutch 23 are locked. Hydraulic pressure is supplied to the low reverse brake 27 through the third main pressure supply passage 65, the low reducing valve 67, the ball valve 68, the 1—2 shift valve passage 66b, the 1—2 shift valve 33 via the second inlet and outlet ports 33b and 33d, and the hydraulic pressure passage 72, in this order, so that the low reverse brake 27 is locked. All other frictional coupling elements receive no hydraulic pressure and remain unlocked.

(10) In the First (1st) range, second gear condition, the manual valve 31 occupies the first (1st) range position. The pressure transmission path for the frictional coupling elements is the same as in the second (2nd) range, second gear condition.

As described above, according to combinations of locking and unlocking of the first to third solenoid valves 83, 85 and 87 shown in TABLE II, lock and unlock patterns of the frictional coupling elements shown in TABLE I are established, so as to shift the automatic transmission AT into any desired range and gear.

Bypass valve 44, which is provided in a first bypass passage 102 bypassing a one-way orifice 101 incorporated in the pressure passage 74 extending to the 3—4 clutch, has a spool 44v and is formed with an inlet port 44a, an outlet port 44b, a pilot pressure chamber 44c and a control pressure chamber 44d. The inlet port 44a is in communication with the first bypass passage 102 disposed upstream of the valve 44. The outlet port 44b is in communication with the first bypass passage 102 disposed downstream of the valve 44. The pilot pressure chamber 44c is supplied with a pilot pressure from the pilot pressure passage 61. The control pressure chamber 44d is supplied with a hydraulic pressure through the pressure passage 74 extending to the 3—4 clutch.

When the automatic transmission AT shifts up from second gear to third gear in the D (Drive) range, the bypass valve 44 initially forces the spool 44v to its one extreme end of movement so that the inlet port 44a and the outlet port 44b are communicated with each other. The first bypass passage 102 abruptly supplies hydraulic pressure to the 3—4 clutch 24. However, when a hydraulic pressure in the pressure passage 74 downstream of the orifice 101, namely, a hydraulic pressure acting on the 3—4 clutch 24, goes beyond a predetermined pressure, a hydraulic pressure developed in the control pressure chamber 44d forces the spool 44v to the opposite extreme end of movement so as to shut off or disconnect the communication of pressure between the inlet port 44a and the outlet port 44b. Therefore, hydraulic pressure is slowly supplied to the 3—4 clutch 24 through the pressure passage 74 and the one-way orifice 101. In such a way, the bypass valve 44 adjusts the characteristics of pressure supply to the 3—4 clutch 24.

The 3—4 shift valve 35 communicates, at the second outlet port 35d, with a pressure passage 104 to which the pressure passages 77 and 81 are joined. The pressure passage 104 branches off, downstream of a juncture 105, into two passages, namely, the pressure passage 81 and the pressure passage 77. The 2—3 timing valve 42 is provided in the pressure passage 104. A second bypass passage 106 is provided so as to bypass the 2—3 timing valve 42 and is provided with a one-way valve 107. The 2—3 timing valve 42 has a spool 42v and is formed with an inlet port 42a, an outlet port 42b, a pilot pressure chamber 42c, and a control pressure chamber 42d. The inlet port 42a is in communication with the pressure passage 104 upstream of the valve 42 and the outlet port 42b is in communication with the pressure passage 104 downstream of the valve 42. The pilot pressure chamber 42c is supplied with a pilot pressure through the pilot pressure passage 61, and the control pressure chamber 42d is supplied with a hydraulic pressure through the pressure passage 74.

In such a way, the 3—4 clutch 24 and the 2—4 brake 26 are locked and unlocked at proper times during a normal second to third gear up-shift in the D range, thereby preventing locking shocks and internal locks.

The coast timing valve 43 is provided in the pressure passage 77. Hydraulic pressure in the pressure passage 63b is introduced at one end of the spool 43v. Since the coast timing valve 43 is provided, the 2—4 brake 26 is certainly unlocked and then the coast clutch 23 is locked during the second gear to third gear up-shift in the D and the second ranges, in which hydraulic pressure is supplied to the coast clutch 23. Therefore, a double lock, in which the 2—4 brake 26 and the coast clutch 23 are locked at the same time, is prevented. The 3—2 timing valve 41 is provided so as to cross a first bypass passage 109 for bypassing a one-way orifice 108 in the pressure passage 71, a second bypass passage 111 for bypassing a one-way orifice 110 in the pressure passage 81, and a third bypass passage 114 for bypassing a fixed orifice 113 in a drain passage 112 for the 3—4 clutch. A pilot pressure passage 115, extending from the line pressure supply passage 51, is connected to one end of the spool 41v of the 3—2 timing valve 41. A fourth solenoid valve 116 is provided in the pilot pressure passage 115. This 3—2 timing valve 41 opens and shuts the first to third bypass passage 109, 111 and 104 through operation of the fourth solenoid valve 116 so as to regulate a timing at which the 2—4 brake is locked during a first gear to second gear up-shift or unlocked during a third gear to second gear down-shift.

During a first gear to second gear up-shift in the D range, the first solenoid valve 83 is turned on, so that the spool 33v of the 1—2 shift valve 33 shifts from the left to the right as viewed in FIG. 3 so as to supply the hydraulic pressure from the first main pressure supply passage 63 to the lock pressure port 26a of the 2—4 brake 26 through the one-way orifice 108. As a result, the 2—4 brake 26 is locked. During the up-shift operation, the fourth solenoid valve 116 is turned on as soon as the up-shift operation begins. Consequently, the spool 41v of the 3—2 timing valve 41 originally shifts to the right, as viewed in FIG. 3, so as to communicate the first bypass passage 109 which bypasses the one-way orifice 108. Accordingly, during the first half of the up-shift operation, the hydraulic pressure, which is supplied to the lock pressure port 26a, raises rapidly. When a predetermined time passes from the beginning of up-shift operation, the fourth solenoid valve 116 is turned off again, so that the spool 41v of the 3—2 timing valve 41 shifts toward the left to shut off the first bypass passage 109. Accordingly, during the second half of the up-shift operation, the hydraulic pressure is supplied to the lock pressure port 26a of the 2—4 brake 26 through the one-way orifice 108. As a result, since a time necessary for a plunger of the servo piston to move is shortened, particularly at the beginning of the up-shift operation, the up-shift operation occurs with a reduced time lag, so as to realize a smooth up-shift operation.

Figure 4:
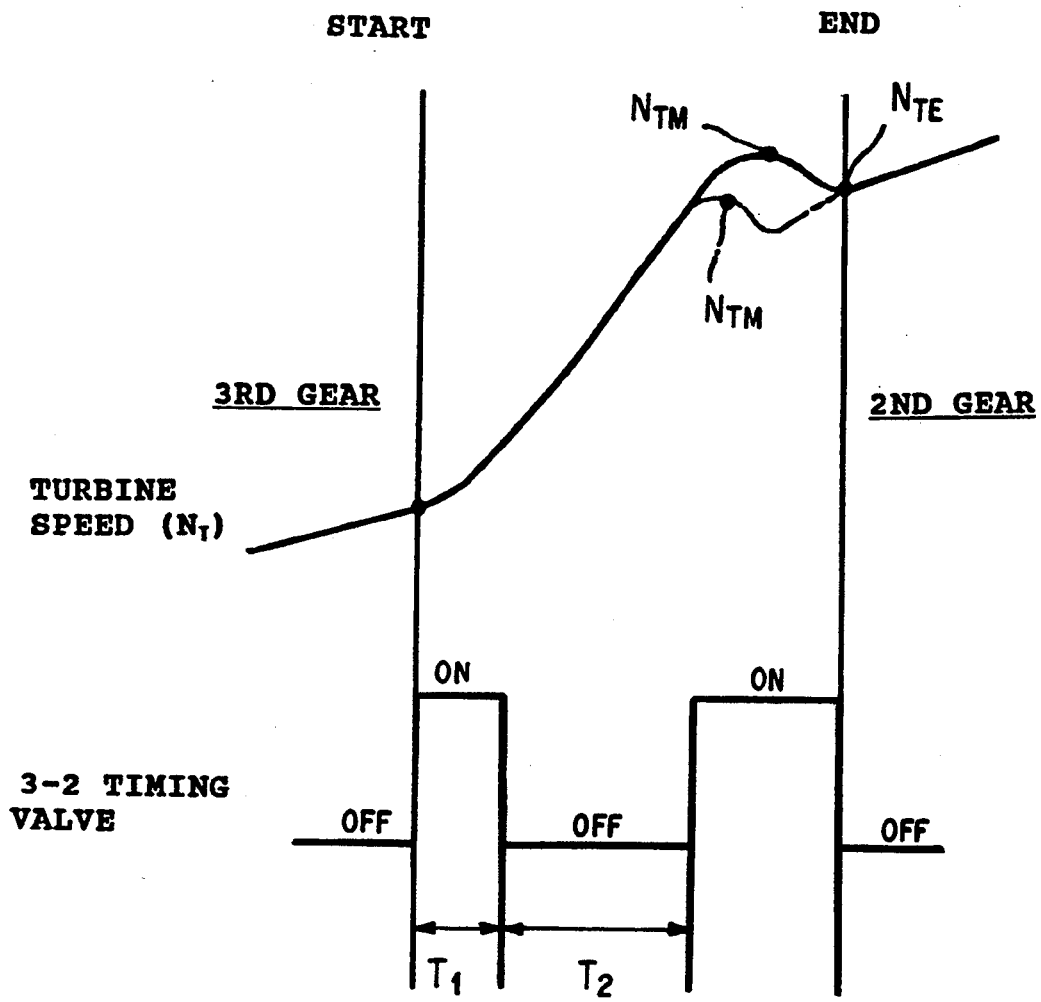
FIG. 4 is a time chart showing a turbine speed and a controlled operation of a 3—2 timing valve during a third gear to gear second down-shift of the automatic transmission of FIG. 1.

During a third gear to second gear down-shift in the D range, the second solenoid valve 85 is turned on, causing the spool 34v of the 2—3 shift valve 34 to shift to the right from the left as viewed in FIG. 3 and disconnect the supply of hydraulic pressure to the pressure passage 74. Simultaneously, since the third solenoid valve 87 is turned on, the spool 35v of the 3—4 shift valve 35 shifts to the right from the left as viewed in FIG. 3, so as to drain the pressure passage 81 of the unlock pressure port 26b. During this operation, the fourth solenoid valve 116 is operated in three stages. That is, the fourth solenoid valve 116 is at first turned on at the beginning of a down-shift operation. The fourth solenoid valve then is turned off, and is finally turned on again. As a result, as is shown in FIG. 4, the 3—2 timing valve 41 is kept turned on for a specific period of time T1 after the presence of a shift command, and then is kept turned off for a specific period of time T2. The fourth solenoid valve is finally turned on again and kept turned on until the completion of the down-shift operation. During the period in which the 3—2 timing valve 41 is kept turned on, the second bypass passage 111, bypassing the one-way orifice 110 of the pressure passage 81, is drained, so that hydraulic pressure developed at the lock pressure port 26a drops quickly. Controlling the initial period of time T1 for which the 3—2 timing valve 41 is kept turned on controls and regulates the rapidness with which the 2—4 brakes 26 are locked. Also, a timing at which unlocking of the 3—4 clutch 24 and locking of the 2—4 brake 26 are caused is regulated.

Generally, it is preferred to boost the turbine speed of the torque converter so that it is slightly higher than an end turbine speed at the completion of a 3—2 down-shift. For this reason, a turbine speed boost, which is defined as the turbine speed difference $\Delta N_T$ between a turbine speed $N_{TM}$ an inflection point during a 3—2 down-shift and an end turbine speed $N_{TE}$ at the end of the 3—2 down-shift, should be kept within a desirable speed difference range.

In this transmission shift control system, the duration time T1 is set as an initial count of a time down-counter and is established as a learned duration time LT1, which is corrected according to conversion efficiency or ratio $\underline{e}$ of the torque converter. The conversion efficiency or ratio $\underline{e}$ which is defined as a ratio of a turbine torque or a rotational turbine speed $N_T$ relative to an end output torque or a rotational engine speed $N_E$ at the beginning of a 3—2 down-shift. The learned duration time LT1 is shortened or extended, according to speed differences between a turbine speed $N_{TM}$ at an inflection point during a 3—2 down-shift and an end turbine speed $N_{TE}$ at the end of the 3—2 down-shift, so that the speed difference falls in a predetermined desired range of speed differences. Further, in the valve timing control, the duration time T1 is corrected according to conversion ratios $\underline{e}$. Specifically, if a conversion ratio $\underline{e}$ is lower than an adequate range of torque conversion ratios $\underline{e}$, the duration time T1 is obtained by subtracting a predetermined slight value $\alpha$ from a nominal duration time $T_B$, which is given from an oil temperature-turbine speed map. On the other hand, if a conversion ratio $\underline{e}$ is higher than an adequate range of torque conversion ratios $\underline{e}$, the duration time T1 is obtained by adding the predetermined slight value $\alpha$ to the nominal duration time $T_B$. Finally, the duration time T1 is renewed by being added to the learned duration time LT1. The oil temperature-turbine speed map defines a nominal duration time $T_B$ so that the duration time becomes longer with a decrease in oil temperature and with a decrease in rotational turbine speed $N_T$.

Figure 7:
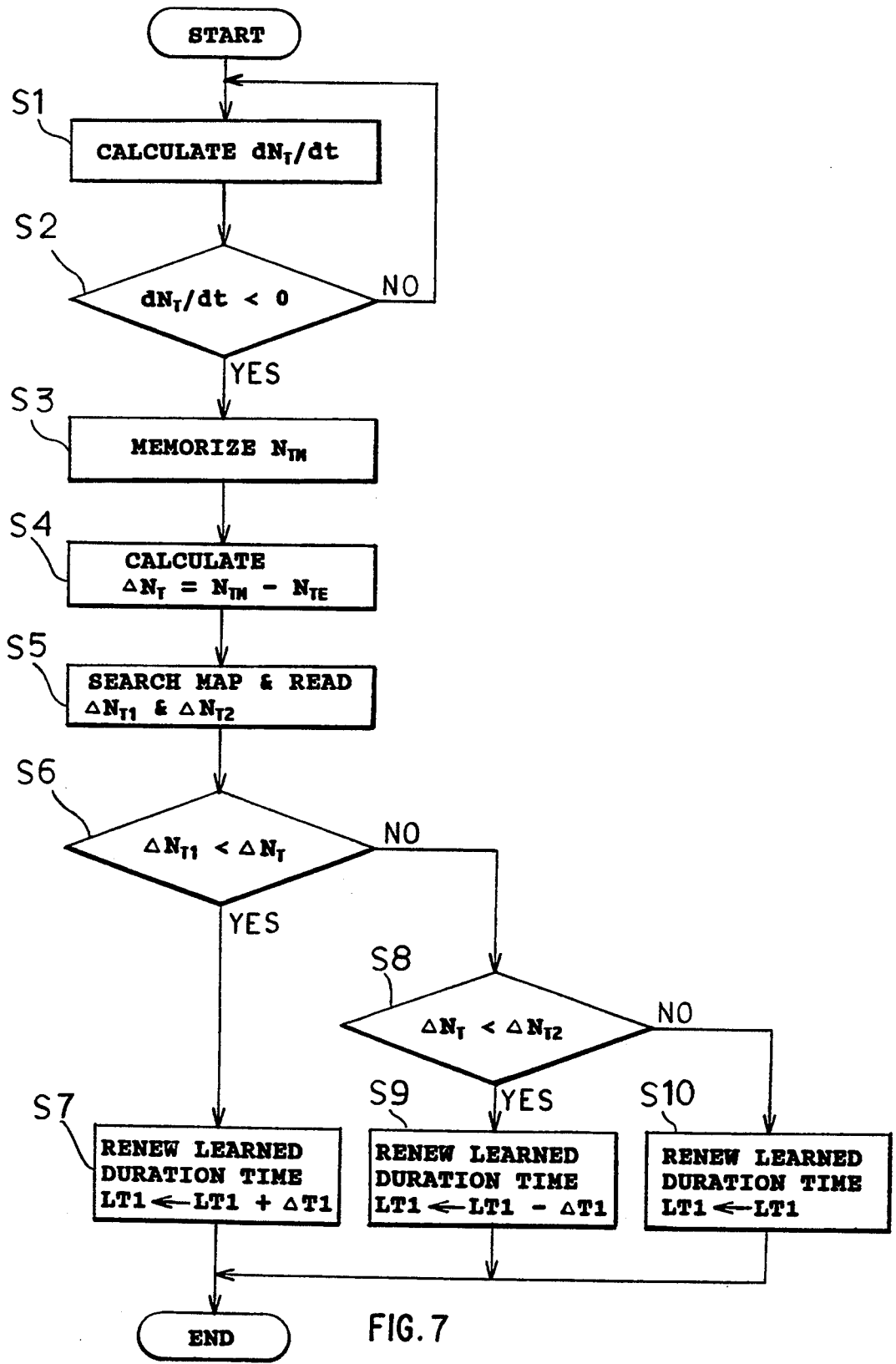
FIG. 7 is a flow chart illustrating a duration time learning control sequence routine for the microcomputer of a control unit.

FIG. 7 is a flow chart illustrating the learned valve control sequence routine taking place during a 3—2 (third gear to second gear) down-shift of the automatic transmission AT. After calculating a turbine speed variation ratio $dN_T/dt$ at which the turbine speed $N_T$ changes during a 3—2 down-shift at step S1, a decision is made at step S2 as to whether or not the turbine speed variation ratio $dN_T/dt$ has become lower than zero. When the turbine speed variation ratio $dN_T/dt$ is zero, the turbine speed $N_T$ has reached a speed $N_{TM}$ at an inflection point (which is referred to as an inflection point turbine speed $N_{TM}$) at which it changes from boosting up to dropping down. The steps S1 and S2 are repeated until the turbine speed variation ratio $dN_T/dt$ falls below zero. When the answer to the decision made at step S2 becomes "YES," inflection point turbine speed $N_{TM}$ at the inflection point is memorized step S3.

At step S4, a calculation is made for a turbine speed drop $\Delta N_T$ between the inflection point turbine speed $N_{TM}$ and an end turbine speed $N_{TE}$ at the completion of the 3—2 down-shift. Then, at step S5, upper and lower speed drop limits $N_{T1}$ and $N_{T2}$, between which the turbine speed drop $\Delta N_T$ should be, are found for the inflection point turbine speed $N_{TM}$. Finding such upper and lower speed drop limits $N_{T1}$ and $N_{T2}$ is performed by searching a boost-decline range judging map or $N_T$-map peculiar to the 3—2 down-shift shown in FIG. 5. The turbine speed drop $\Delta N_T$ is judged as to whether or not it is larger than the upper speed drop limit $N_{T1}$ at step S6. If the answer to the decision is "YES," the turbine speed drop $\Delta N_T$ is assumed to be in the boost region. Then, the learned value is increased by a predetermined correction value $T_1$, which is fairly small, so as to speed up the locking of the 2—4 brake at step S7. However, if the answer to the decision made at step S6 is "NO," then another decision is made at step S8 as to whether or not the turbine speed drop $\Delta N_T$ is less than the lower speed drop limit $N_{T2}$. If the answer to the decision made at step S8 is "YES," the turbine speed drop $\Delta N_T$ is assumed to be in a "decline" region. Then, the learned value is reduced by the predetermined correction value $T_1$ so as to retard the locking of the 2—4 brake at step S9. After step S7, and when the answer to the decision at step S8 is "NO," the sequence routine ends.

Figure 8B:
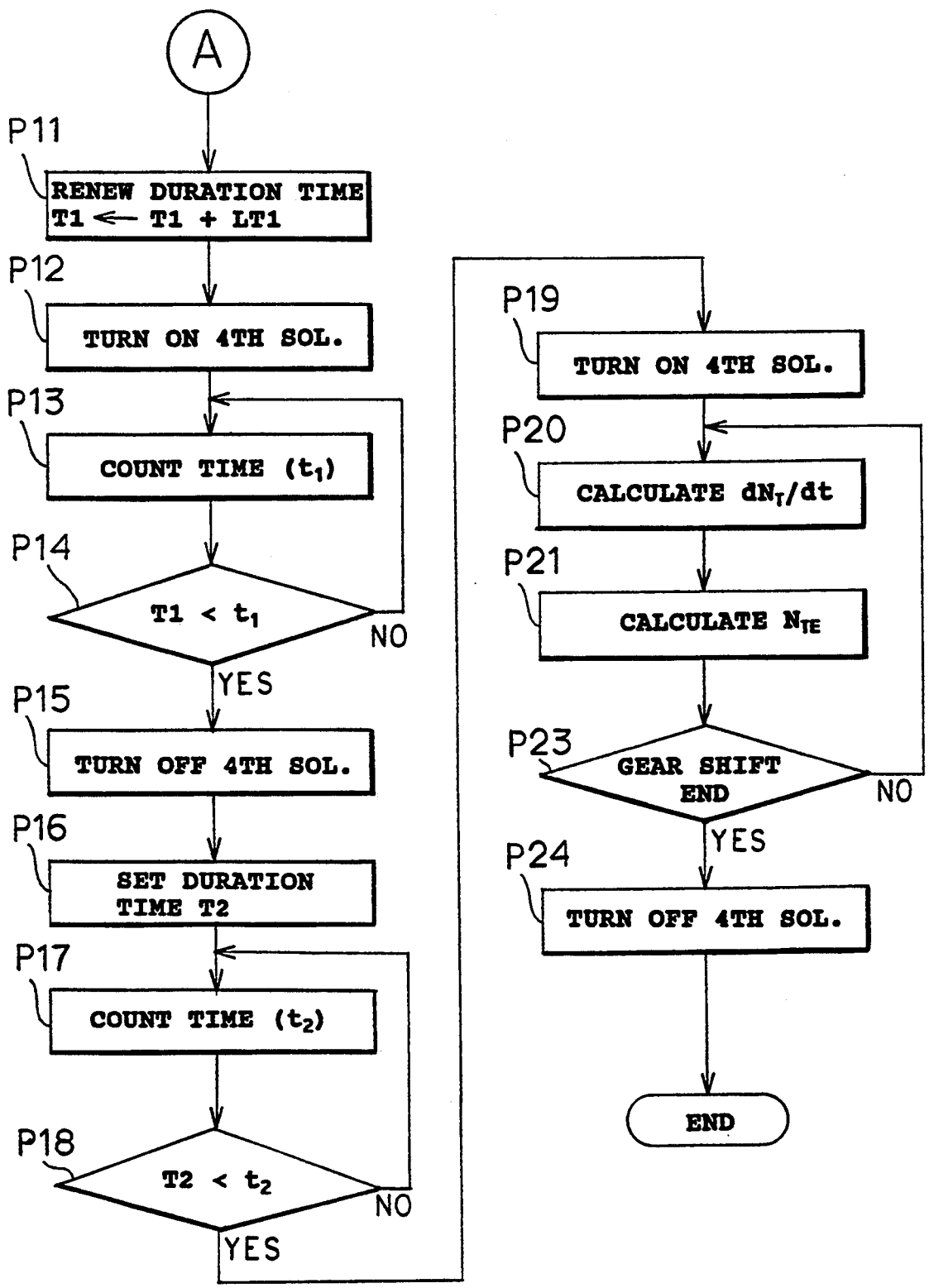
FIG. 8 is a flow chart illustrating a 3—2 timing valve locking control main sequence routine for the microcomputer of the control unit.

FIG. 8 is a flow chart illustrating the 3—2 timing valve control main sequence routine. The first step P1 is to read various control parameters, such as the temperature of oil in the automatic transmission AT, a rotational engine speed $N_E$, a rotational turbine speed $N_T$, a throttle valve opening TV0, and a vehicle speed $N_V$. At step P2, a decision is made as to whether or not the 3—2 (third gear to second gear) down-shift is selected. This decision is made based on throttle valve opening TV0 and a vehicle speed $N_V$ with reference to an automatic shift control map, in a manner well known in the art. These steps P1 and P2 are repeated until the answer to the decision made in step P2 becomes "YES," which indicates that the 3—2 (third gear to second gear) down-shift has been selected.

When the answer to the decision made at step P2 becomes "YES," then, a turbine speed $N_{TS}$ is memorized at the beginning of a 3—2 down-shift operation at step P3. Subsequently, a conversion ratio, for example, a speed conversion ratio $\underline{e}$ ($N_T/N_E$), is memorized for the starting turbine speed $N_{TS}$ at step P4. At step P5, searching the oil temperature-turbine speed map, shown in FIG. 6, takes place to find out a nominal duration time $T_B$ for the 3—2 timing valve 41. Thereafter, at step P6, a decision is made as to whether or not the torque convertor ratio $\underline{e}$ is equal to or less than a predetermined speed conversion ratio $e_1$. If the answer to the decision made at step P6 is "YES," it is assumed that a torque, input to the torque converter, has a tendency to decline. Then, the duration time $T_1$ for the 3—2 timing valve 41 is changed by reducing the nominal duration time $T_B$ by a predetermined slight value $\alpha$ at step P7. However, if the answer to the decision made at step P6 is "NO," then another decision is made at step P8 as to whether or not the speed conversion ratio $e$ is greater than a predetermined conversion ratio $e_2$ but does not exceed a predetermined conversion ratio $e_3$. If the answer to the decision made at step P8 is "YES," it is assumed that the torque input to the torque converter has a tendency to boost. Then, the duration time $T_1$ of opening of the 3—2 timing valve 41 is changed by increasing the nominal duration time $T_B$ by the predetermined slight value $\alpha$ at step P9. If the answer to the decision made at step P8 is "NO," the nominal duration time $T_B$ is used as the duration time T1 of opening of the 3—2 timing valve 41 at step P10. When the duration time T1 of opening of the 3—2 timing valve 41 is fixed at step P7, P9 or P10, a substantial duration time T1 is established, at step P11, as the sum of the duration time T1 corrected previously and the learned value established in the learned valve control sequence.

At step P12, the fourth solenoid valve 116 is turned on so as to cause the 3—2 timing valve 41 to open and, simultaneously, the timer starts to count time at step P12. Subsequently, a decision is made at step P14 as to whether or not the timer has counted a time $t_1$ greater than the substantial duration time T1. The decision is repeated until the timer counts a time $t_1$ equal to the substantial duration time T1. When the answer to the decision made at step P14 becomes "YES," the fourth solenoid valve 116 is turned off so as to cause the 3—2 timing valve 41 to shut at step P15. Subsequently, a duration time T2 for which the 3—2 timing valve 41 is closed is set to a fixed value at step P16 and, simultaneously, the timer starts to count time at step P17. At step P18, a decision is made as to whether or not the timer has counted out a time $t_2$ greater than the duration time T2. The decision is repeated until the timer counts at a time $t_2$ equal to the duration time T2. When the answer to the decision made at step P18 becomes "YES," the fourth solenoid valve 116 is turned on again so as to cause the 3—2 timing valve 41 to open at step P19.

Calculations are then made consecutively at steps P20 and P21 to find a turbine speed variation ratio $dN_T/dt$, at which the turbine speed $N_T$ changes, and an end turbine speed $N_{TE}$ which is expected at the end of the 3—2 down-shift, respectively. The end turbine speed $N_{TE}$ is determined to be the product of the start turbine speed $N_{TS}$ at the beginning of the 3—2 down-shift, memorized at step P3, and a ratio of the third gear to the second gear. A decision is then made at step P22 as to whether or not the automatic transmission has completed the 3—2 down-shift. Completion of the 3—2 down-shift is determined to have occurred only when the turbine speed $N_T$ falls within predetermined limits of the end turbine speed $N_{TE}$ ($N_{TE}\pm n$) and a turbine speed variation ratio $dN_T/dt$ is below a predetermined ratio. The decision is repeated until the answer to the decision made at step P22 becomes "YES." When the automatic transmission completes the 3—2 down-shift, the fourth solenoid valve 116 is turned off at step P23 and the sequence terminates.

Figure 9:
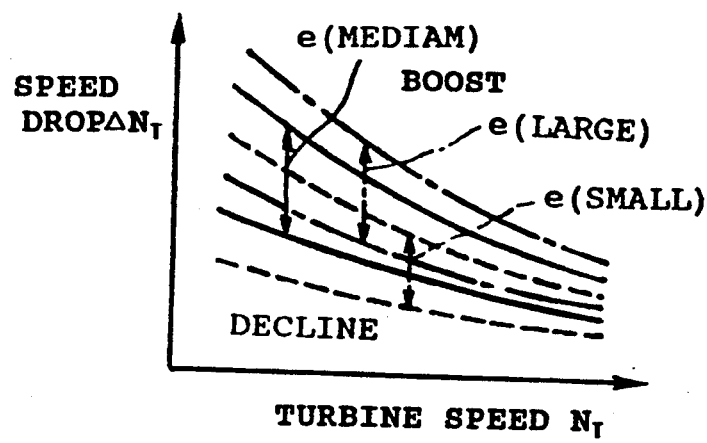
FIG. 9 is a map of speed drop limits used in a duration time learning control.
Figure 16:
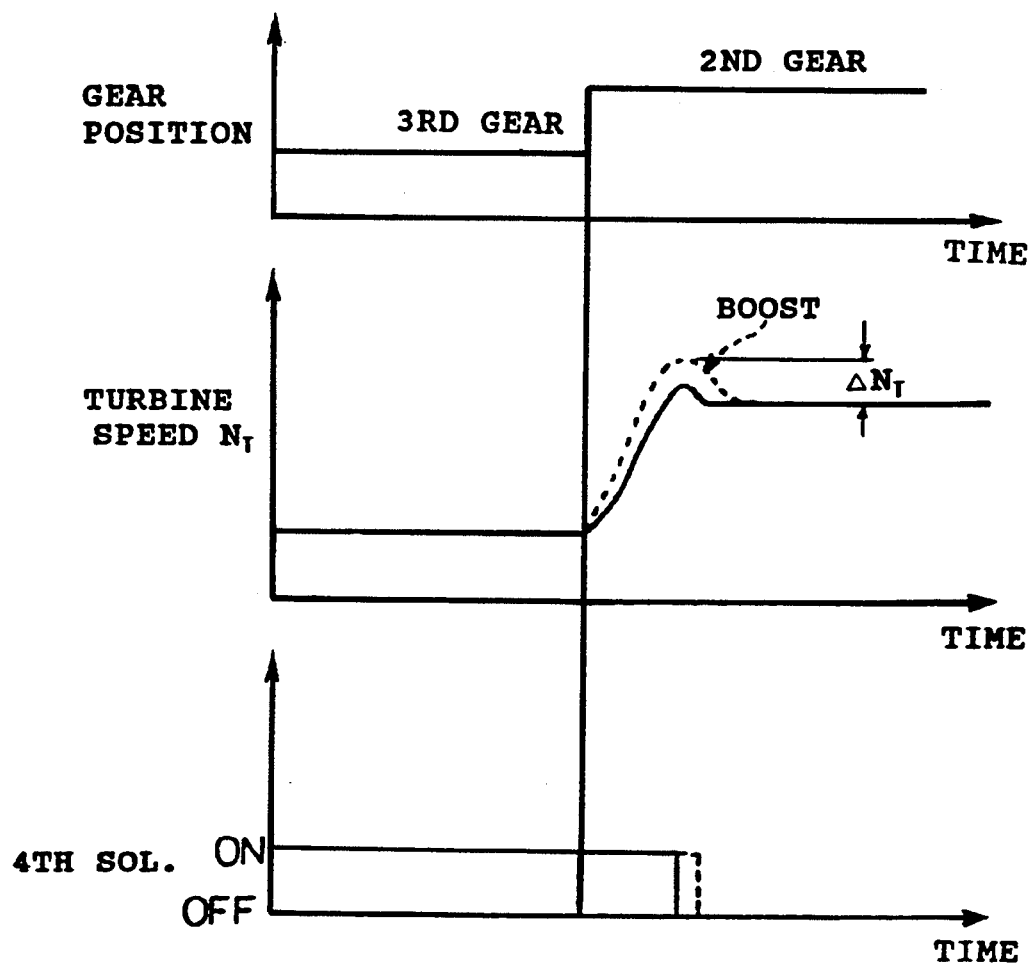
FIG. 16 is a time chart showing a turbine speed and a controlled operation of a 3—2 timing valve during a third gear to second gear down-shift of the automatic transmission of FIG. 1.

In place of the boost-decline range judging map or $N_T$-map shown in FIG. 5, a variable boost-decline range judging map or $N_T$-map may be used. That is, upper and lower speed drop limits $N_{T1}$ and $N_{T2}$ of the turbine speed drop $\Delta N_T$ are varied linearly according to conversion ratios $e$ as shown in FIG. 9. When using such a variable boost-decline range judging map, the valve timing control is performed according to control sequence routines illustrated by flow charts shown in FIGS. 10 and 11. Steps which are identical to those of the flow charts shown in FIGS. 7 and 8 have been designated by the same reference numbers and, therefore, are not described.

Figure 10:
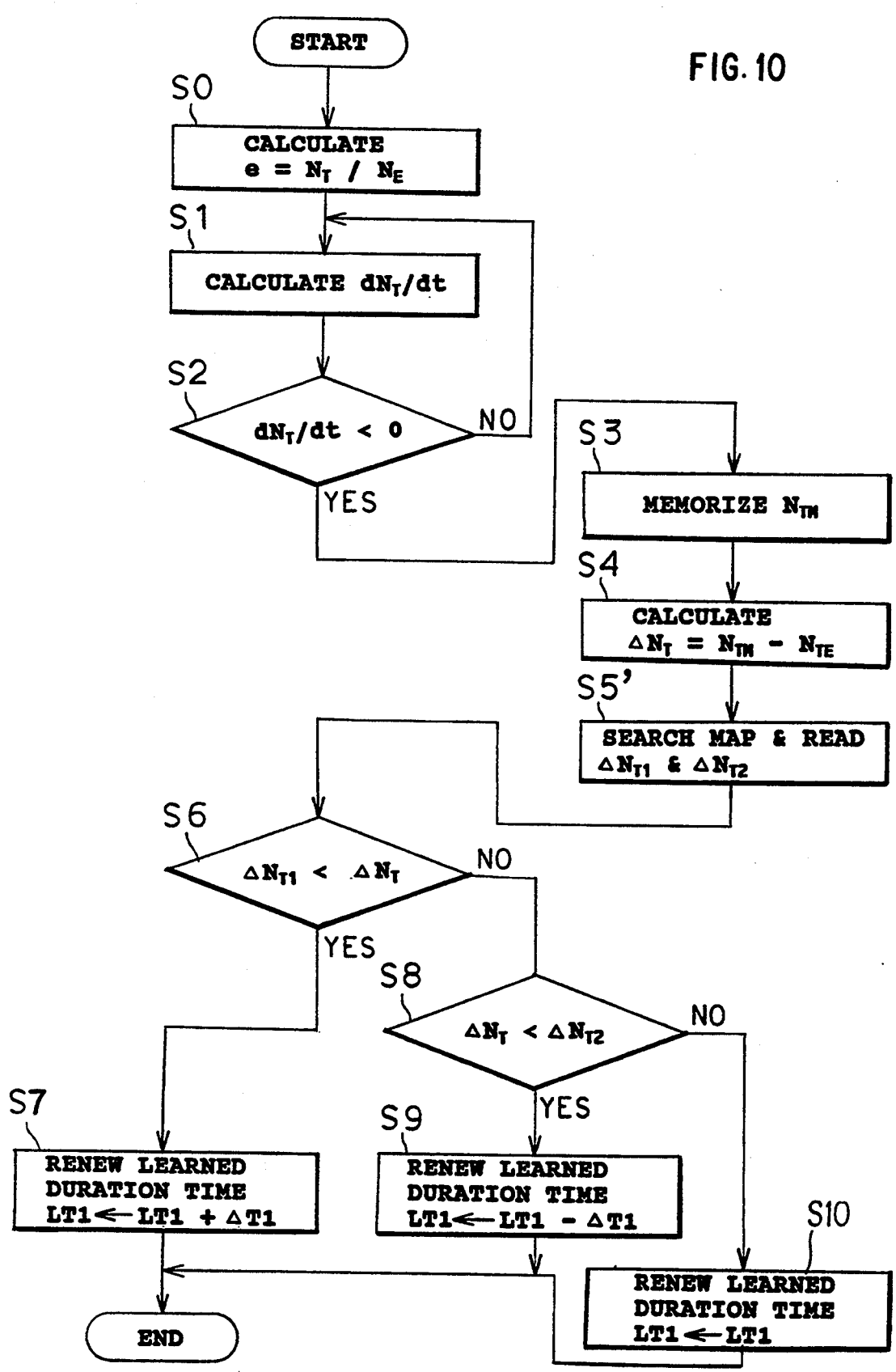
FIG. 10 is a flow chart illustrating a duration time learning control sequence routine for the microcomputer of the control unit in which the map shown in FIG. 9 is used.

FIG. 10 is a flow chart of the duration time learning control sequence routine. Before calculating a turbine speed variation ratio $dN_T/dt$ at which the turbine speed $N_T$ changes during a 3—2 down-shift at step S1, a torque converter ratio $e$, at the beginning of a 3—2 down-shift, is memorized at step S0. At step S5', upper and lower speed drop limits $\Delta N_{T1}$ and $\Delta N_{T2}$ are found for the conversion ratio $e$ memorized at step S0.

Figure 11:
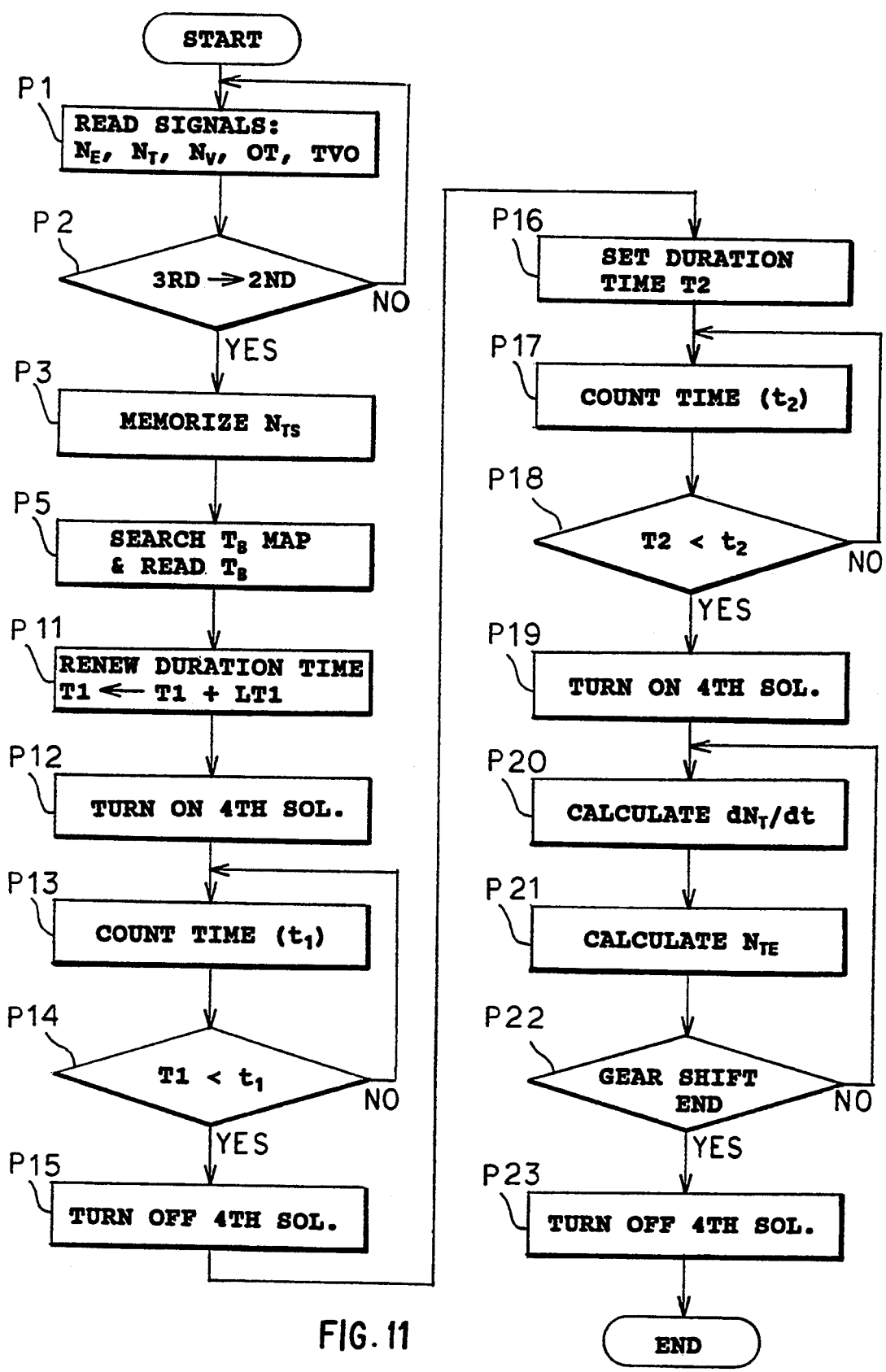
FIG. 11 is a flow chart illustrating a 3—2 timing valve locking control main sequence routine for the microcomputer of the control unit, in which a learned duration time determined in the duration time learning control shown in FIG. 10 is used.

FIG. 11 is a flow chart of the 3—2 timing valve control main sequence routine. Because the duration time T1 has been learned and corrected by taking into consideration the conversion ratio $e$ in the duration time learning control, steps P4 and P6 to P9 of the timing valve control main sequence shown in FIG. 8 are omitted.

Although the boost-decline judging map shown in FIG. 5 is used, the duration time T1 may be corrected by taking into consideration conversion ratios $e$. Such a duration time learning control is performed by a sequence routine illustrated by a flow chart shown in FIG. 12.

Figure 12:
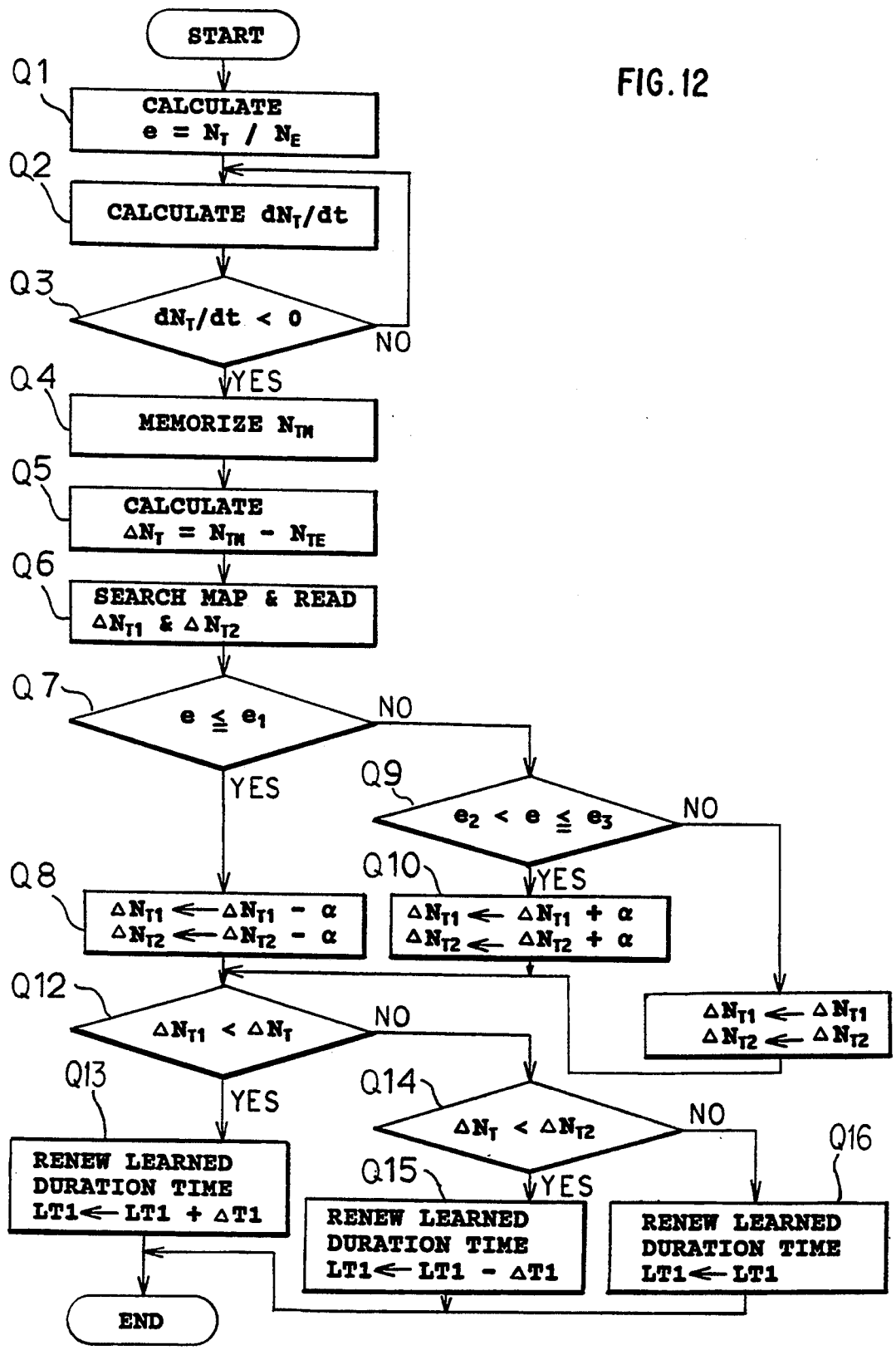
FIGS. 12 and 13 are flow charts illustrating variations of the duration time learning control shown in FIG. 8.

Referring to FIG. 12, after performing steps Q1 to Q6, which are the same as steps S0 and S1 to S5' of the duration time learning control sequence routine shown in FIG. 10, a decision is made at step Q7 as to whether or not the conversion ratio $e$ is equal to or less than a predetermined conversion ratio $e_1$. If the answer to the decision made at step Q7 is "YES," it is assumed that an input torque supplied to the torque converter has a tendency to decline. Then, the map values of upper and lower speed drop limits $\Delta N_{T1}$ and $\Delta N_{T2}$ are respectively reduced by a predetermined slight value $\alpha$ at step Q8. However, if the answer to the decision made at step Q7 is "NO," another decision is made at step Q9 as to whether or not the conversion ratio $e$ is greater than a predetermined conversion ratio $e_2$ but does not exceed a predetermined conversion ratio $e_3$. If the answer to the decision made at step Q9 is "YES," it is assumed that the input torque supplied to the torque converter has a tendency to boost. Then, the map values representative of upper and lower speed drop limits $\Delta N_{T1}$ and $\Delta N_{T2}$ are increased by the predetermined value $\alpha$ at step P10. When the answer to the decision made at step Q9 is "NO," the map values representative of the upper and lower limits $\Delta N_{T1}$ and $\Delta N_{T2}$ are fixed at step Q11.

After having reduced, increased or fixed the map values representative of upper and lower limits $\Delta N_{T1}$ and $\Delta N_{T2}$, steps Q12 to Q15, which are the same as steps S6 to S9, respectively, of the duration time learning control sequence routine shown in FIG. 7 are conducted.

In this duration time learning control, the upper and lower limits $\Delta N_{T1}$ and $\Delta N_{T2}$ may changed according to turbine speed drops $\Delta N_T$ rather than according to conversion ratios $e$. Alternatively, the learned duration time itself may be changed according to both of turbine speed drops $\Delta N_T$ and conversion ratios $\underline{e}$.

Figure 13A:
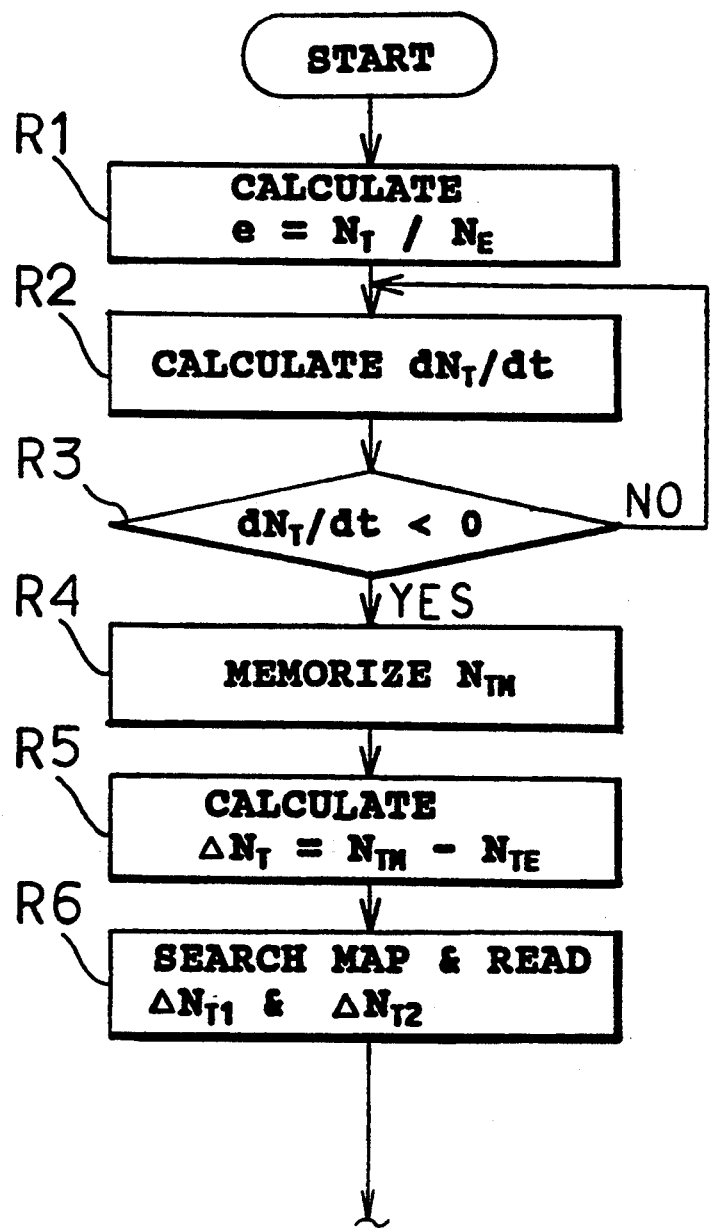
Figure 13B:
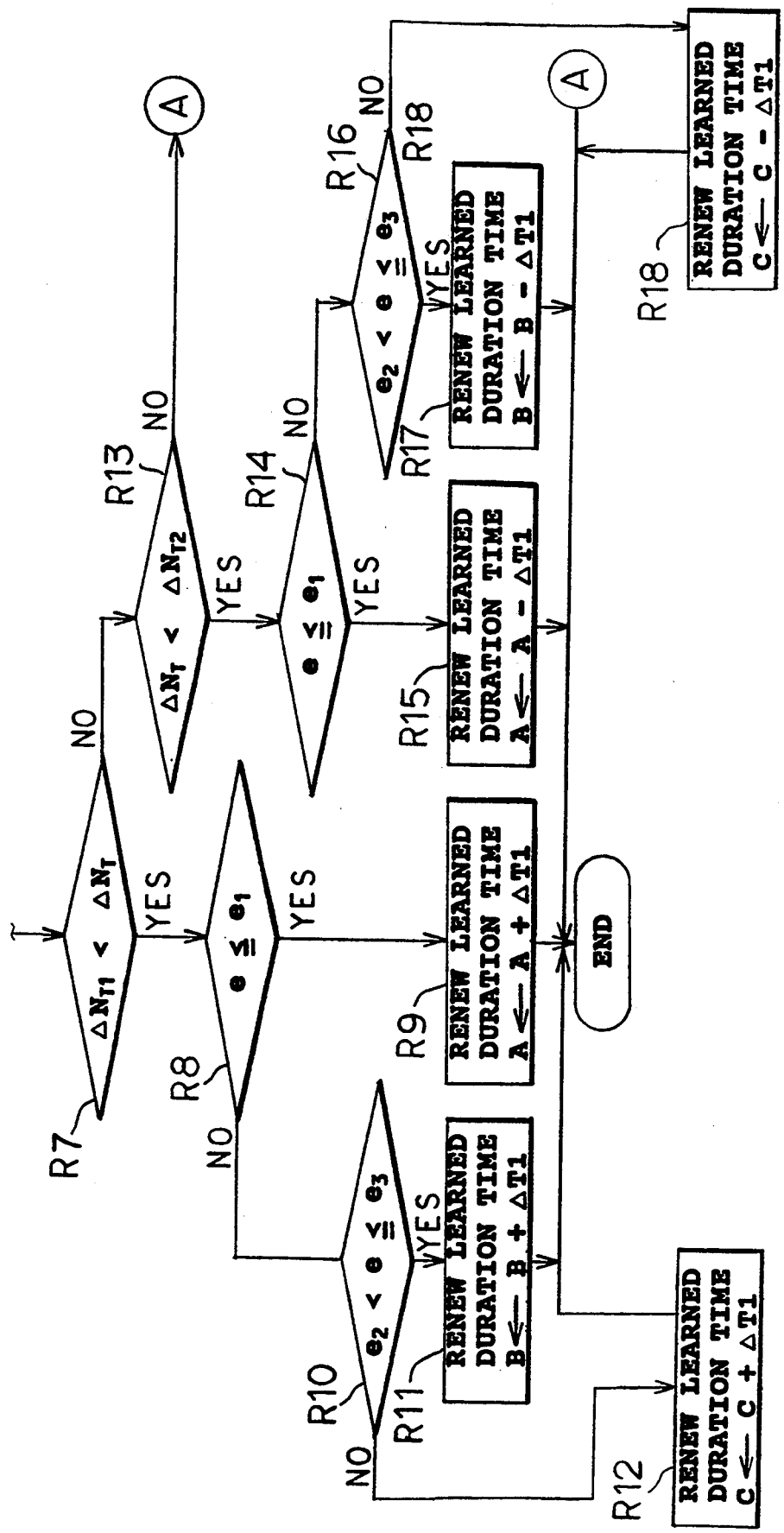

FIG. 13 is a flow chart representing the duration time learning sequence routine. Predetermined duration times, predetermined and assigned to three regions of turbine speed variation ratios, are selectively used according to torque convertor ratios. In this duration time learning sequence routine shown in FIG. 13, after performing steps R1 to R6, which are the same as steps Q1 to Q6 of the duration time learning control sequence routine shown in FIG. 12, a decision is made at step R7 as to whether or not the turbine speed drop $\Delta N_T$ is greater than the upper limit $\Delta N_{T1}$. If the answer to the decision made at step R7 is "YES," then a further decision is made at step R8 as to whether or not the torque convertor ratio $\underline{e}$ is equal to or less than a predetermined conversion ratio $e_1$. If the answer to the decision made at step R8 is "YES," it is assumed that an input torque supplied to the torque converter has a tendency to decline. Then, prefixed duration time $\underline{A}$, which is assigned to a region of input torque having a tendency to decline, is selected and increased by a small value $\Delta_{T1}$. If the answer to the decision made at step R8 is "NO," then another decision is made at step R10 as to whether or not the conversion ratio $\underline{e}$ is greater than a predetermined conversion ratio $e_2$ and equal to or less than a predetermined conversion ratio $e_3$. If the answer to the decision made at step R10 is "YES," it is assumed that an input torque supplied to the torque converter has a tendency to boost. Then, a prefixed duration time $\underline{B}$, which is assigned to a region of input torque having a boost tendency, is selected and is increased by the small value $\Delta_{T1}$ at step R11. If the answer to the decision made at step R10 is "NO," a prefixed duration time $\underline{C}$, which is assigned to a region of adequate input torque, is selected and is increased by the small value $\Delta_{T1}$ at step R12.

If the answer to the decision made at step R7 concerning the upper limit $\Delta N_{T1}$ is "NO," a decision is made at step R13 as to whether or not the turbine speed drop $\Delta N_T$ is less than the lower limit $\Delta N_{T2}$. If the answer to the decision made at step R13 is "YES," then another decision is made at step R14 as to whether or not the conversion ratio $\underline{e}$ is equal to or less than a predetermined conversion ratio $e_1$. If the answer to the decision made at step R14 is "YES," it is assumed that an input torque supplied to the torque converter has a tendency to decline. Then, the duration time $\underline{A}$ is selected and is decreased by the small value $\Delta_{T1}$ at step R15. If the answer to the decision made at step R14 is "NO," then another decision is made at step R16 as to whether or not the conversion ratio $\underline{e}$ is greater than the predetermined conversion ratio $e_2$ and equal to or less than the predetermined conversion ratio $e_3$. If the answer to the decision made at step R16 is "YES," it is assumed that an input torque supplied to the torque converter has a boost tendency. Then, the duration time $\underline{B}$ is selected and is decreased by the small value $\Delta_{T1}$ at step R17. If the answer to the decision made at step R17 is "NO," the duration time $\underline{C}$ is selected and is increased by the small value $\Delta_{T1}$ at step R18.

Figure 14:
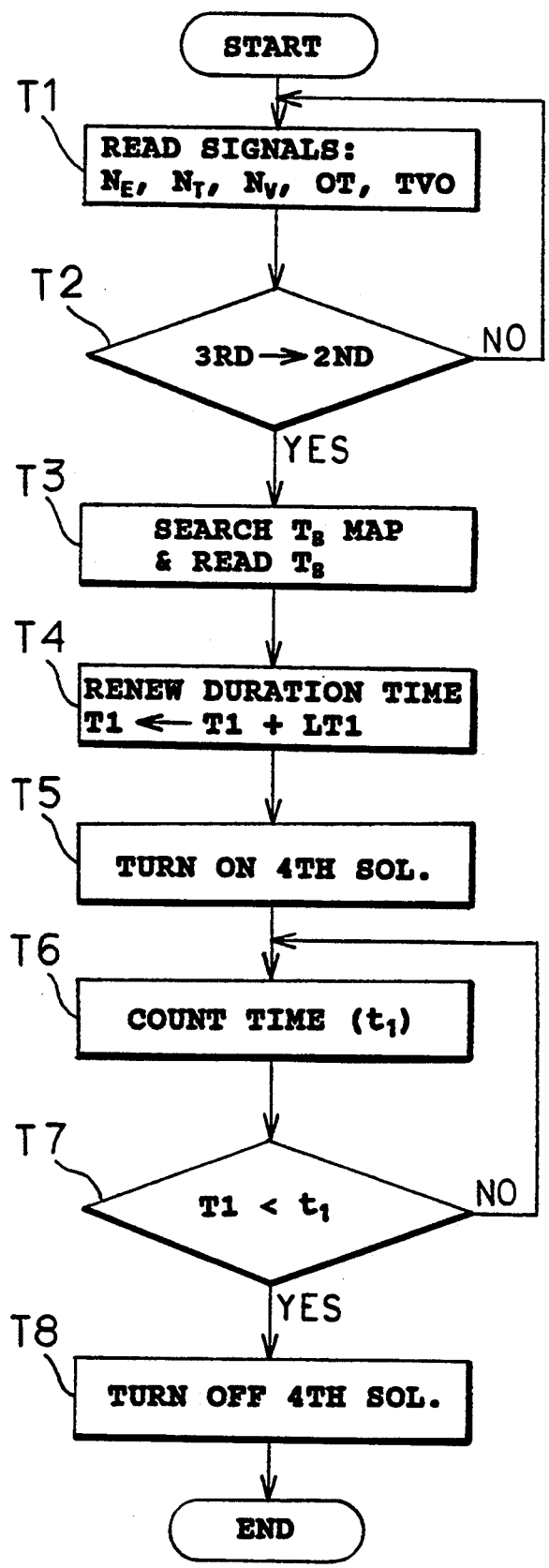
FIG. 14 is a flow chart illustrating a 3—2 timing valve locking control main sequence routine for the microcomputer of the control unit.
Figure 15:
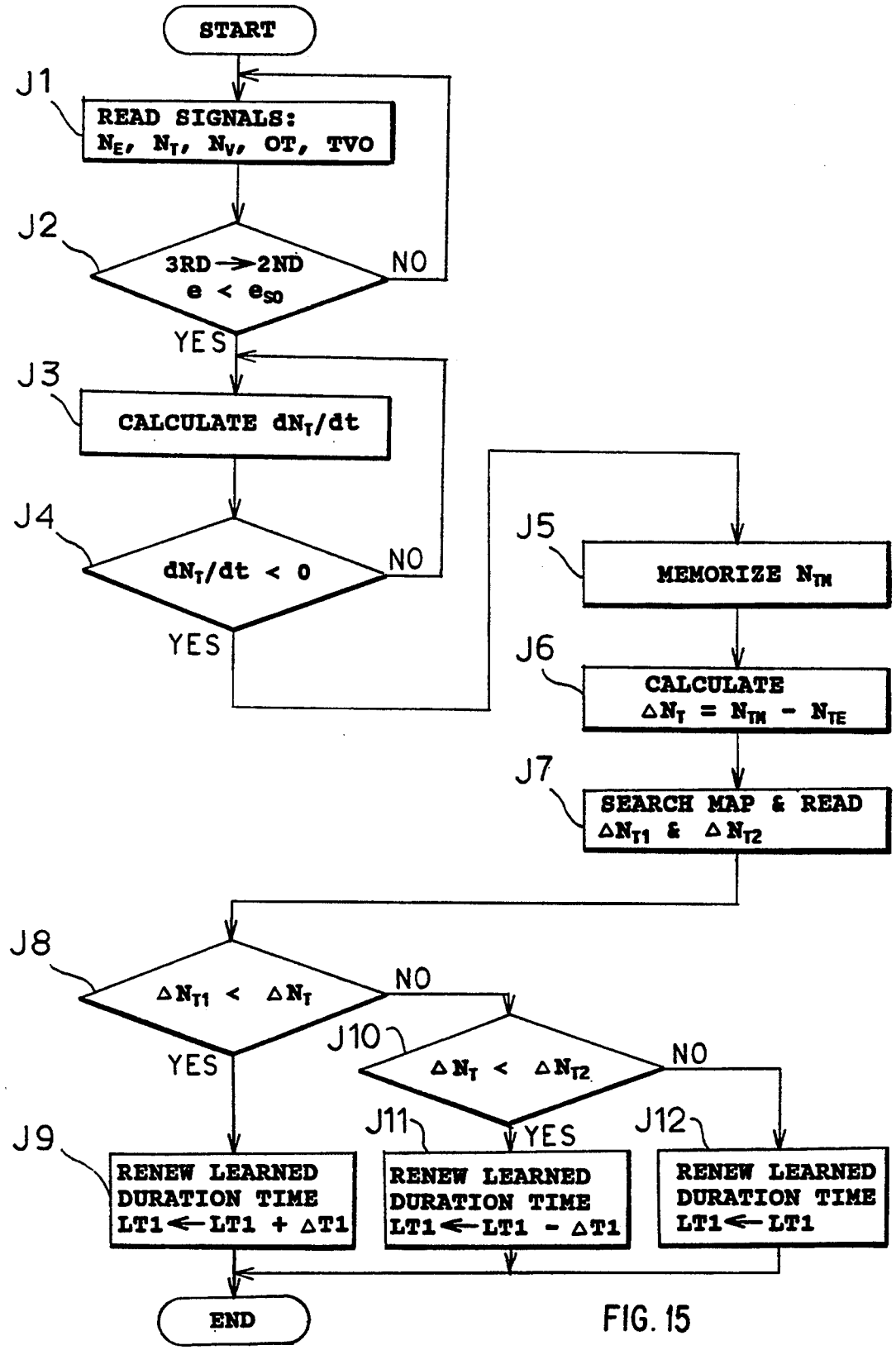
FIG. 15 is a flow chart illustrating a duration time learning control sequence routine for providing a learned duration time used in the 3—2 timing valve locking control shown in FIG. 14.

FIGS. 14 and 15 are flow charts illustrating a 3—2 timing valve locking control sequence routine and a duration time learning control sequence routine, respectively. The learning control is conducted only under a limited condition. In the 3—2 timing valve locking control, the fourth solenoid valve 116 is turned on and off only once during a 3—2 down-shift. The first step T1 in the flow chart shown in FIG. 14 is to read various information, such as an automatic transmission oil temperature (OT), an engine speed ($N_E$), a turbine speed ($N_T$), a vehicle speed ($N_V$) and a throttle opening (TVO). At step T2, a decision is made as to whether or not a 3—2 down-shift should be conducted. This decision is made by searching a shift control map, established in terms of vehicle speed ($N_V$) and a throttle opening (TVO), which may be any type of shift control map well known to those skilled in the art. When the vehicle speed ($N_V$) and the throttle opening (TVO) are suitable for a 3—2 down-shift, the oil temperature-turbine speed map represented in FIG. 6 is searched to find a nominal duration time $T_B$ according to the oil temperature (TO) and the turbine speed ($N_T$) at step T3. Subsequently, a duration time T1 is renewed by adding the previous learned duration time LT1 at step T4. After setting the initial count of a timer to the renewed duration time of T1+LT1, the fourth solenoid valve 116 is turned on so as to cause the 3—2 timing valve 41 to open at step T5 and, simultaneously, the timer starts to count the set time down at step T6. At step T7, a decision is made as to whether or not the timer has counted up the set time T1+LT1. After the timer has counted up the set time T1+LT1, after turning off the fourth solenoid valve 116 so as to close the 3—2 timing valve 41 at step T8, the sequence ends.

Simultaneously with the progression of the 3—2 timing valve locking control through steps T3 to T5, the duration time learning control shown in FIG. 15 is conducted. After calculating a conversion ratio $\underline{e}$ ($=N_T/N_V$) at step J1, a decision is made at step J2 as to whether or not a 3—2 down-shift should be conducted and the conversion ratio $\underline{e}$ at the beginning of the 3—2 down-shift is equal to or less than a specific conversion ratio $e_{SO}$. This decision is made by searching the shift control map in the same manner as at step T2 in the 3—2 timing valve locking control sequence. The specific conversion ratio $e_{SO}$ is previously established so as to be suitable for a predetermined gentle change in throttle valve opening (TVO). If the answer to the decision made at step J2 is "NO," the steps J1 and J2 are repeated. When the answer to the decision made at step J2 is "YES," or in other words, if the conversion ratio $\underline{e}$ is equal to or less than the predetermined specific conversion ratio $e_{SO}$, the accelerator pedal is being depressed gently and the vehicle is speeding up sufficiently to shift the automatic transmission into the second gear from the third gear. Then, the sequence proceeds forward to steps J3 through J12 so as to perform a duration time learning control. The steps J3 through J12 are the same as the steps S1 through S10, respectively, shown in FIG. 11.

In the 3—2 timing valve locking control, the duration time learning control is conducted only when the torque convertor operates at a conversion ratio $\underline{e}$ equal to or less than the predetermined specific conversion ratio $e_{SO}$. Thus, the duration time learning control is conducted only when (a) the automatic transmission is shifted to the second gear from the third gear as a result of a gentle opening of the throttle valve and the engine speed and (b) the input torque supplied to the transmission gear mechanism 5 changes following an increasing change in throttle valve opening. Consequently, incorrect learning of a duration time T1 is prevented, and a learned duration time LT1 is properly calculated. This results in a proper correction of the duration time T1 being made, causing a locking operation of the 2—4 brake 26 to be responsive to an unlocking of the 3—4 clutch 24 during a third gear to second gear down-shift of the automatic transmission caused by a gentle opening of the throttle valve. Shift shock, therefore, is effectively reduced. Furthermore, detection of the input torque supplied to the transmission gear mechanism 5 is performed with high accuracy because it is made based on a torque conversion ratio $\bar{e}$.

Instead of being conducted when a conversion ratio e is equal to or less than the specific conversion ratio $e_{SO}$ during a 3—2 down-shift at step J2, the duration time learning control may be conducted based on a judgement as to whether or not a torque conversion ratio of the torque convertor 3 is greater than a specific ratio. The duration time learning control may also be conducted based on a detection or determination of a change in engine load which is smaller than a specific change or detection of an acceleration of the vehicle during a 3—2 down-shift which is lower than a specific ratio based on whether or not a variation ratio of opening of the throttle valve is less than a specific ratio corresponding to a gentle throttle opening operation. In the latter case, the detection of input torque supplied to the transmission gear mechanism 5 is easy and precise.

It is to be understood that although a preferred embodiment of the present invention has been described in detail, various other embodiments and variants may occur to those skilled in the art. Any such other embodiments and variants which fall within the spirit and scope of the invention are intended to be covered by the following claims.

What is claimed is:

1. A shift control system for controlling a shift operation of an automatic transmission having a torque converter through which a transmission gear mechanism is connected to engine output means, said transmission gear mechanism having a plurality of frictional coupling elements which are selectively locked and unlocked by hydraulic control means to perform an automatic shift operation of said automatic transmission into desired gears, said shift control system comprising:
   valve means, included in said hydraulic control means, for connecting and disconnecting a supply of hydraulic pressure to said frictional coupling elements so that said frictional coupling elements are locked and unlocked;
   time regulating means for regulating a duration time for which said valve means is kept actuated and, in turn, a speed at which at least one of said frictional coupling elements is locked;
   input and output speed detecting means for detecting rotational input speed and rotational output speed of said torque converter; and
   control means for calculating a conversion efficiency as a ratio of the rotational input speed of said torque converter relative to the rotational output speed of said torque converter for controlling said time regulating means so as to variably regulate said duration time according to said conversion efficiency.

2. A shift control system for controlling a shift operation of an automatic transmission having a torque converter through which a transmission gear mechanism is connected to engine output means, said transmission gear mechanism having a plurality of frictional coupling elements which are selectively locked and unlocked by hydraulic control means to perform an automatic shift operation of said automatic transmission into desired gears, said shift control system comprising:
   valve means, included in said hydraulic control means, for connecting and disconnecting a supply of hydraulic pressure to said frictional coupling elements so that said frictional coupling elements are locked and unlocked;
   time regulating means for regulating a duration time for which said valve means is kept actuated and, in turn, a speed at which at least one of said frictional coupling elements is locked;
   input and output detecting means for detecting a first rotational speed input to and a second rotational speed output from said torque converter; and
   control means for calculating a conversion efficiency based on said first rotational speed and said second rotational speed detected by said input and output detecting means and for controlling said time regulating means so as to shorten said duration time when said control means calculates a conversion efficiency which is lower than a predetermined low conversion efficiency and increase said duration time when said control means calculates a conversion efficiency which is higher than a predetermined high conversion efficiency.

3. A shift control system as defined in claim 2, wherein said control means learns and changes said duration time only when said control means calculates a conversion efficiency lower than a predetermined conversion efficiency.

4. A shift control system as defined in claim 3, wherein said input and output detecting means comprises speed detecting means for detecting a rotational speed of a turbine and a rotational speed of said engine output means, and said control means calculates said conversion efficiency as a speed ratio of said rotational speed of said turbine relative to said rotational speed of said engine output means.

5. A shift control system for controlling a shift operation of an automatic transmission having a torque converter through which a transmission gear mechanism is connected to an engine output means, said transmission gear mechanism having a plurality of frictional coupling elements which are selectively locked and unlocked by hydraulic control means for controlling the frictional coupling elements to perform an automatic shift operation of said automatic transmission into desired gears, said shift control system comprising:
   valve means, included in said hydraulic control means, for connecting and disconnecting a supply of hydraulic pressure to said frictional coupling elements so that said frictional coupling elements are locked and unlocked;
   time regulating means for regulating a duration time for which said valve means is kept actuated and, in turn, a speed at which at least one of said frictional coupling elements is locked;
   detecting means for detecting a first rotational speed input to and a second rotational speed output from said torque converter;
   conversion efficiency calculating means for calculating a conversion efficiency of said torque converter based on the first and second rotational speeds detected by said detecting means;
   speed change calculating means for calculating a speed change of an input speed supplied to said transmission gear mechanism;

learning value calculating means for calculating a learning value of said duration time by comparing the speed change of the input speed to a predetermined value so as to increase the learning value when the speed change is smaller than the predetermined value and to decrease the learning value when the speed change is larger than the predetermined value;

predetermined value changing means for increasing the predetermined value when the conversion efficiency is larger than a second predetermined value and decreasing the predetermined value when the conversion efficiency is smaller than the second predetermined value; and control means for controlling said time regulating means so as to variably regulate the duration time based on the learning value.

6. A shift control system as defined in claim 5, and further comprising learning value storing means for storing a plurality of the learning values;

wherein said control means selects a corresponding one of the learning values based on the conversion efficiency.

* * * * *